US011112889B2

(12) United States Patent
Lee

(10) Patent No.: US 11,112,889 B2
(45) Date of Patent: Sep. 7, 2021

(54) ELECTRONIC DEVICE AND METHOD FOR MAPPING FUNCTION OF ELECTRONIC DEVICE TO OPERATION OF STYLUS PEN

(71) Applicant: Samsung Electronics Co., Ltd., Gyeonggi-do (KR)

(72) Inventor: Seonho Lee, Gyeonggi-do (KR)

(73) Assignee: Samsung Electronics Co., Ltd., Suwon-si (KR)

( * ) Notice: Subject to any disclaimer, the term of this patent is extended or adjusted under 35 U.S.C. 154(b) by 0 days.

(21) Appl. No.: 16/774,146

(22) Filed: Jan. 28, 2020

(65) Prior Publication Data
US 2020/0249773 A1 Aug. 6, 2020

(30) Foreign Application Priority Data
Feb. 1, 2019 (KR) .......................... 10-2019-0013462

(51) Int. Cl.
*G06F 3/0354* (2013.01)
*G06F 3/041* (2006.01)
*G06F 3/0484* (2013.01)

(52) U.S. Cl.
CPC ...... *G06F 3/03545* (2013.01); *G06F 3/04162* (2019.05); *G06F 2203/0384* (2013.01)

(58) Field of Classification Search
CPC ........................... G06F 3/0354; G06F 3/03545
See application file for complete search history.

(56) References Cited

U.S. PATENT DOCUMENTS 5,969,712 A * 10/1999 Morita .................. G06F 3/0482
345/179
9,342,162 B2 * 5/2016 Song ................... G06F 3/04883
(Continued)

FOREIGN PATENT DOCUMENTS

| CN | 110908582 A | 3/2020 |
|---|---|---|
| KR | 10-2018-0040985 A | 4/2018 |
| KR | 10-2020-0095972 A | 8/2020 |

OTHER PUBLICATIONS

International Search Report dated May 8, 2020.

*Primary Examiner* — Sepehr Azari
(74) *Attorney, Agent, or Firm* — Cha & Reiter, LLC.

(57) ABSTRACT

An electronic device according to certain embodiments may comprise a display configured to display a user interface including one or more objects corresponding to one or more functions; at least one wireless communication circuit configured to wirelessly connect to a stylus pen; at least one processor operatively connected to the display and the wireless communication circuit; and a memory operatively connected to the at least one processor, wherein the memory is configured to store the user interface, and wherein the memory stores instructions that, when executed, cause the at least one processor to: provide the user interface to the display; detect contact or proximity of the stylus pen with a selected object of the one or more objects of the user interface on the display, wherein the selected object corresponds to a selected function of the one or more functions; receive a first user input using the stylus pen through the wireless communication circuit, the first user input having a selected stylus pen input type from one or more stylus pen input types, while the stylus pen is in contact or proximate to the selected object; and in response to the first user input, map the selected function to the selected stylus pen input type.

18 Claims, 23 Drawing Sheets

(56) References Cited

U.S. PATENT DOCUMENTS

| | | | |
|---|---|---|---|
| 9,766,723 B2* | 9/2017 | Hicks | G06F 3/0488 |
| 9,766,724 B2* | 9/2017 | Feng | G06F 3/038 |
| 2008/0005423 A1* | 1/2008 | Jacobs | A61B 5/0002 |
| | | | 710/62 |
| 2008/0238887 A1* | 10/2008 | Love | G06F 3/03545 |
| | | | 345/179 |
| 2014/0055426 A1* | 2/2014 | Park | G06F 3/03545 |
| | | | 345/179 |
| 2015/0220205 A1 | 8/2015 | Yun | |
| 2015/0248215 A1 | 9/2015 | Graf et al. | |
| 2016/0004424 A1 | 1/2016 | Suzuki et al. | |
| 2018/0059817 A1* | 3/2018 | Pirie | G06F 1/1626 |
| 2018/0120966 A1* | 5/2018 | Bollineni | G06F 3/0488 |
| 2020/0050308 A1 | 2/2020 | Lee et al. | |
| 2020/0249774 A1* | 8/2020 | Jung | G06F 3/04162 |

\* cited by examiner

ELECTRONIC DEVICE AND METHOD FOR MAPPING FUNCTION OF ELECTRONIC DEVICE TO OPERATION OF STYLUS PEN

CROSS-REFERENCE TO RELATED APPLICATION(S)

This application is based on and claims priority under 35 U.S.C. 119 from Korean Patent Application No. 10-2019-0013462, filed on Feb. 1, 2019, in the Korean Intellectual Property Office, the disclosure of which is herein incorporated by reference in its entirety.

BACKGROUND

1) Field

The disclosure relates to an electronic device and, for example, to a method of mapping a function of an electronic device to an operation of a stylus pen in an electronic device capable of executing various functions using a stylus pen.

2) Description of Related Art

With the development of mobile communication and hardware/software technology, portable electronic devices (hereinafter, referred to as "electronic devices"), which are represented by smartphones, have evolved to include various functions. An electronic device provides a user interface to allow a user to easily access various functions, and the user interface may be displayed on a touch screen display.

The touch screen display may detect a touch made using a user's finger by any of various touch sensing methods, and recent electronic devices provide an input method using a stylus pen for more precise work (e.g., writing a memo, drawing, etc.). Accordingly, the user may perform a touch input and/or a hovering input on the user interface on the touch screen display using the stylus pen.

The above information is presented as background information only to assist with an understanding of the disclosure. No determination has been made, and no assertion is made, as to whether any of the above might be applicable as prior art with regard to the disclosure.

SUMMARY

An electronic device according to certain embodiments may comprise: a display configured to display a user interface including one or more objects corresponding to one or more functions; at least one wireless communication circuit configured to wirelessly connect to a stylus pen; at least one processor operatively connected to the display and the wireless communication circuit; and a memory operatively connected to the at least one processor, wherein the memory is configured to store the user interface, and wherein the memory stores instructions that, when executed, cause the at least one processor to: provide the user interface to the display; detect contact or proximity of the stylus pen with a selected object of the one or more objects of the user interface on the display, wherein the selected object corresponds to a selected function of the one or more functions; receive a first user input using the stylus pen through the wireless communication circuit, the first user input having a selected stylus pen input type from one or more stylus pen input types, while the stylus pen is in contact or proximate to the selected object; and in response to the first user input, map the selected function to the selected stylus pen input type.

An electronic device in accordance with certain embodiments may comprise: a display configured to display a user interface; at least one wireless communication circuit configured to wirelessly connect to a stylus pen; at least one processor operatively connected to the display and the wireless communication circuit; and a memory operatively connected to the at least one processor, wherein the memory is configured to store the user interface, and wherein the memory stores instructions that, when executed, cause the at least one processor to: provide the user interface to the display; detect contact or proximity of the stylus pen with a point or area coordinates; receive a first user input using the stylus pen through the wireless communication circuit, the first user input having a selected stylus pen input type from one or more stylus pen input types, while the stylus pen is in contact or proximate with the point or area coordinates; and in response to the first user input, map a function corresponding to the identified point or area coordinates to the selected stylus pen input type.

In certain embodiments, a method of mapping a function of an electronic device to an operation of a stylus pen, the method comprising: displaying a user interface for selecting one or more functions; detecting contact or proximity of the stylus pen to a location within the user interface for selecting a function of one or more functions while the user interface is being displayed; receiving a first user input using the stylus pen from the stylus pen while detecting contact or proximity of the stylus pen to the location within the user interface, the first user input having a selected stylus pen input type of one or more stylus pen input types; and in response to the first user input, mapping the selected function to the selected stylus pen user input type.

Certain embodiments of the disclosure can provide an electronic device by which a user can directly map a function of an electronic device to an operation of a stylus pen and a method of mapping a function of an electronic device to an operation of a stylus pen.

BRIEF DESCRIPTION OF THE DRAWINGS

For a more complete understanding of the disclosure and its advantages, reference is now made to the following description taken in conjunction with the accompanying drawings, in which like reference numerals represent like parts.

In connection with the description of the drawings, the same or similar reference numerals may be used for the same or similar elements.

DETAILED DESCRIPTION

In addition, recent electronic devices may be wirelessly connected to the stylus pen so that the stylus pen is able to serve as a remote controller for executing a specific function.

Existing electronic devices provide only a few predetermined operations using the stylus pen even if the stylus pen and the electronic device are wirelessly connected.

Certain embodiments of the disclosure may have the objective of providing an environment in which a user can directly map a function of an electronic device to an operation of a stylus pen, as well as executing predetermined functions of the electronic device using the stylus pen.

Figure 1:
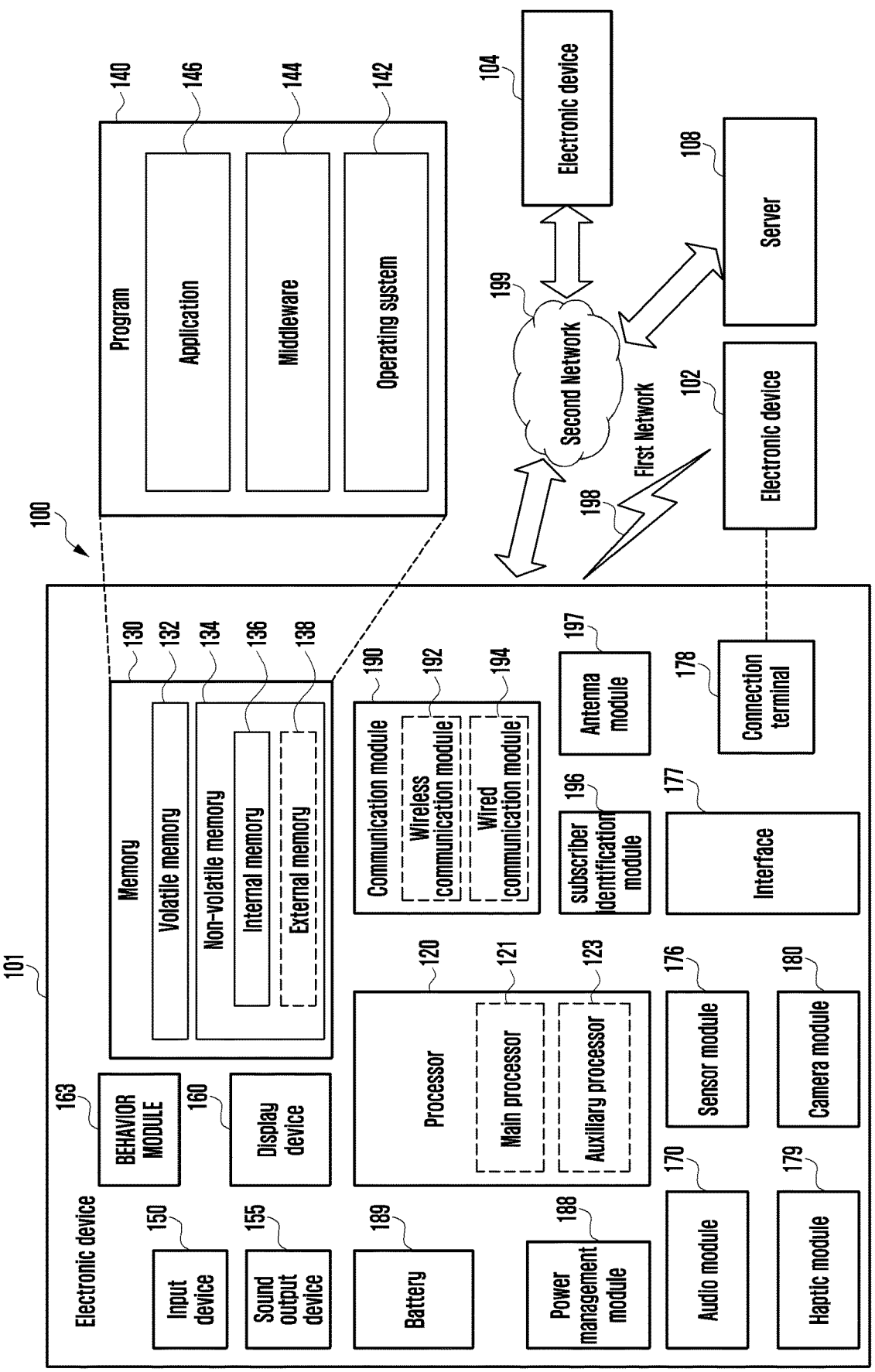
FIG. 1 is a block diagram of an electronic device in a network environment according to certain embodiments.
Figure 2:
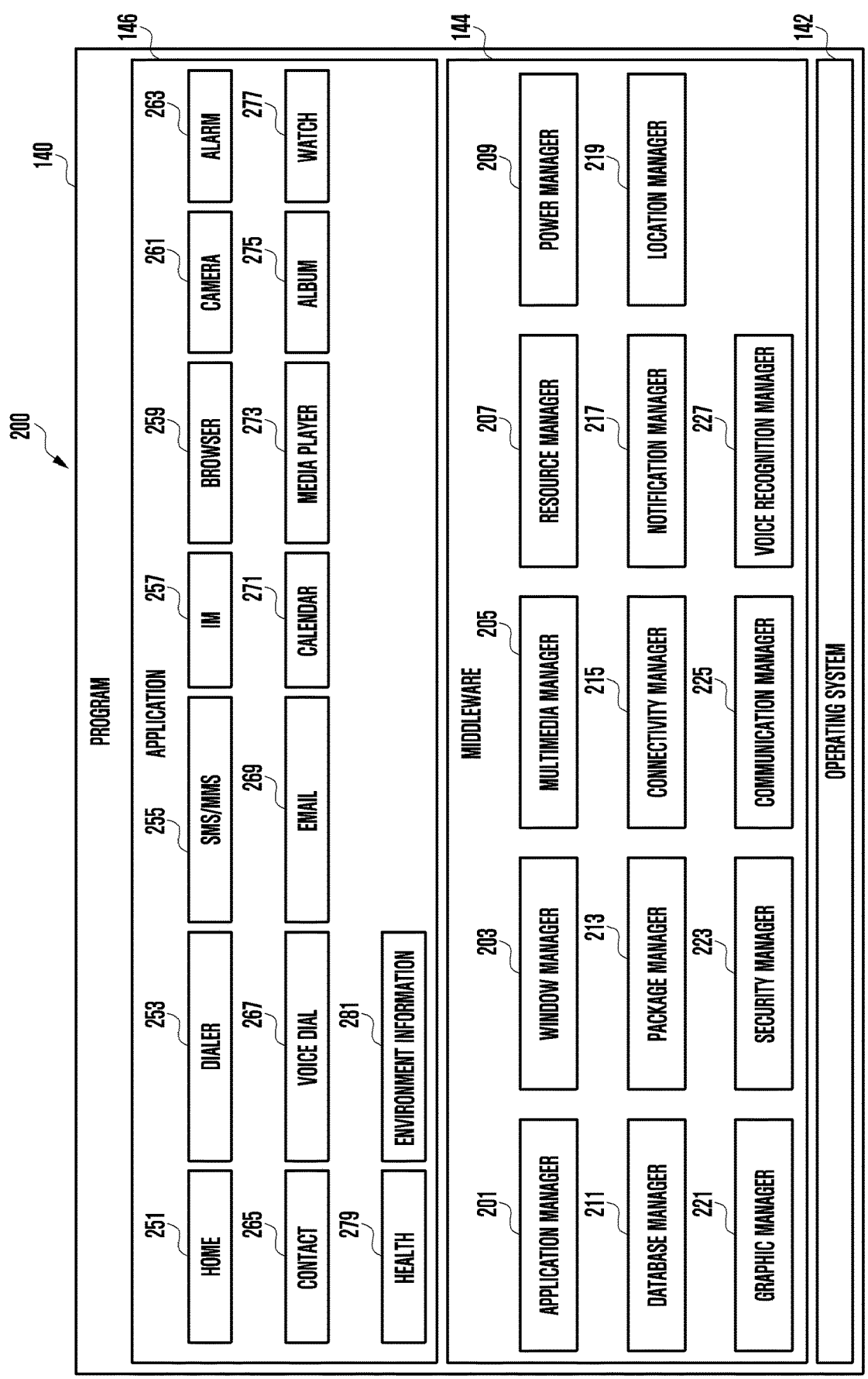
FIG. 2 is a block diagram of a program according to certain embodiments.
Figure 3A:
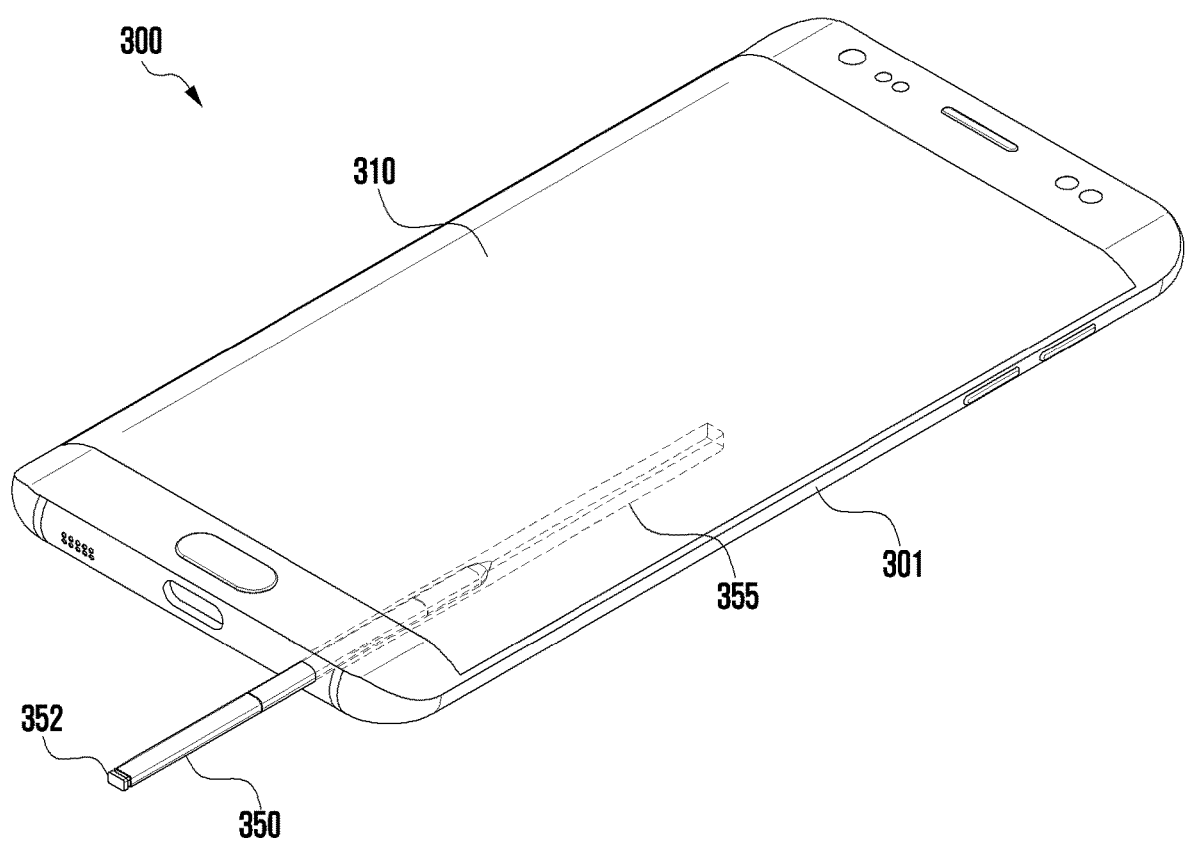
FIG. 3A illustrates the appearance of an electronic device according to certain embodiments.

FIG. 1 describes the hardware of an electronic device, while FIG. 2 describes the software architecture of the electronic device, in accordance with certain embodiments. FIG. 3A describes the housing of the electronic device accommodating a stylus pen, while FIGS. 3B and 3C describe the stylus pen in accordance with certain embodiments.

Electronic Device

FIG. 1 is a block diagram illustrating an electronic device 101 in a network environment 100 according to certain embodiments. Referring to FIG. 1, the electronic device 101 in the network environment 100 may communicate with an electronic device 102 via a first network 198 (e.g., a short-range wireless communication network), or an electronic device 104 or a server 108 via a second network 199 (e.g., a long-range wireless communication network). According to an embodiment, the electronic device 101 may communicate with the electronic device 104 via the server 108. According to an embodiment, the electronic device 101 may include a processor 120, memory 130, an input device 150, a sound output device 155, a display device 160, an audio module 170, a sensor module 176, an interface 177, a haptic module 179, a camera module 180, a power management module 188, a battery 189, a communication module 190, a subscriber identification module (SIM) 196, or an antenna module 197. In some embodiments, at least one (e.g., the display device 160 or the camera module 180) of the components may be omitted from the electronic device 101, or one or more other components may be added in the electronic device 101. In some embodiments, some of the components may be implemented as single integrated circuitry. For example, the sensor module 176 (e.g., a fingerprint sensor, an iris sensor, or an illuminance sensor) may be implemented as embedded in the display device 160 (e.g., a display).

The processor 120 may execute, for example, software (e.g., a program 140) to control at least one other component (e.g., a hardware or software component) of the electronic device 101 coupled with the processor 120, and may perform various data processing or computation. According to one embodiment, as at least part of the data processing or computation, the processor 120 may load a command or data received from another component (e.g., the sensor module 176 or the communication module 190) in volatile memory 132, process the command or the data stored in the volatile memory 132, and store resulting data in non-volatile memory 134. According to an embodiment, the processor 120 may include a main processor 121 (e.g., a central processing unit (CPU) or an application processor (AP)), and an auxiliary processor 123 (e.g., a graphics processing unit (GPU), an image signal processor (ISP), a sensor hub processor, or a communication processor (CP)) that is operable independently from, or in conjunction with, the main processor 121. Additionally or alternatively, the auxiliary processor 123 may be adapted to consume less power than the main processor 121, or to be specific to a specified function. The auxiliary processor 123 may be implemented as separate from, or as part of the main processor 121.

The auxiliary processor 123 may control at least some of functions or states related to at least one component (e.g., the display device 160, the sensor module 176, or the communication module 190) among the components of the electronic device 101, instead of the main processor 121 while the main processor 121 is in an inactive (e.g., sleep) state, or together with the main processor 121 while the main processor 121 is in an active state (e.g., executing an application). According to an embodiment, the auxiliary processor 123 (e.g., an image signal processor or a communication processor) may be implemented as part of another component (e.g., the camera module 180 or the communication module 190) functionally related to the auxiliary processor 123.

The memory 130 may store various data used by at least one component (e.g., the processor 120 or the sensor module 176) of the electronic device 101. The various data may include, for example, software (e.g., the program 140) and input data or output data for a command related thereto. The memory 130 may include the volatile memory 132 or the non-volatile memory 134.

The program 140 may be stored in the memory 130 as software, and may include, for example, an operating system (OS) 142, middleware 144, or an application 146.

The input device 150 may receive a command or data to be used by other component (e.g., the processor 120) of the electronic device 101, from the outside (e.g., a user) of the electronic device 101. The input device 150 may include, for example, a microphone, a mouse, a keyboard, or a digital pen (e.g., a stylus pen).

The sound output device 155 may output sound signals to the outside of the electronic device 101. The sound output device 155 may include, for example, a speaker or a receiver. The speaker may be used for general purposes, such as playing multimedia or playing record, and the receiver may be used for an incoming calls. According to an embodiment, the receiver may be implemented as separate from, or as part of the speaker.

The display device 160 may visually provide information to the outside (e.g., a user) of the electronic device 101. The display device 160 may include, for example, a display, a hologram device, or a projector and control circuitry to control a corresponding one of the display, hologram device, and projector. According to an embodiment, the display device 160 may include touch circuitry adapted to detect a touch, or sensor circuitry (e.g., a pressure sensor) adapted to measure the intensity of force incurred by the touch.

The audio module 170 may convert a sound into an electrical signal and vice versa. According to an embodiment, the audio module 170 may obtain the sound via the input device 150, or output the sound via the sound output device 155 or a headphone of an external electronic device (e.g., an electronic device 102) directly (e.g., wiredly) or wirelessly coupled with the electronic device 101.

The sensor module 176 may detect an operational state (e.g., power or temperature) of the electronic device 101 or an environmental state (e.g., a state of a user) external to the electronic device 101, and then generate an electrical signal or data value corresponding to the detected state. According to an embodiment, the sensor module 176 may include, for example, a gesture sensor, a gyro sensor, an atmospheric pressure sensor, a magnetic sensor, an acceleration sensor, a grip sensor, a proximity sensor, a color sensor, an infrared (IR) sensor, a biometric sensor, a temperature sensor, a humidity sensor, or an illuminance sensor.

The interface 177 may support one or more specified protocols to be used for the electronic device 101 to be coupled with the external electronic device (e.g., the electronic device 102) directly (e.g., wiredly) or wirelessly. According to an embodiment, the interface 177 may include, for example, a high definition multimedia interface (HDMI), a universal serial bus (USB) interface, a secure digital (SD) card interface, or an audio interface.

A connecting terminal 178 may include a connector via which the electronic device 101 may be physically connected with the external electronic device (e.g., the electronic device 102). According to an embodiment, the connecting terminal 178 may include, for example, a HDMI connector, a USB connector, a SD card connector, or an audio connector (e.g., a headphone connector).

The haptic module 179 may convert an electrical signal into a mechanical stimulus (e.g., a vibration or a movement) or electrical stimulus which may be recognized by a user via his tactile sensation or kinesthetic sensation. According to an embodiment, the haptic module 179 may include, for example, a motor, a piezoelectric element, or an electric stimulator.

The camera module 180 may capture a still image or moving images. According to an embodiment, the camera module 180 may include one or more lenses, image sensors, image signal processors, or flashes.

The power management module 188 may manage power supplied to the electronic device 101. According to one embodiment, the power management module 188 may be implemented as at least part of, for example, a power management integrated circuit (PMIC).

The battery 189 may supply power to at least one component of the electronic device 101. According to an embodiment, the battery 189 may include, for example, a primary cell which is not rechargeable, a secondary cell which is rechargeable, or a fuel cell.

The communication module 190 may support establishing a direct (e.g., wired) communication channel or a wireless communication channel between the electronic device 101 and the external electronic device (e.g., the electronic device 102, the electronic device 104, or the server 108) and performing communication via the established communication channel. The communication module 190 may include one or more communication processors that are operable independently from the processor 120 (e.g., the application processor (AP)) and supports a direct (e.g., wired) communication or a wireless communication. According to an embodiment, the communication module 190 may include a wireless communication module 192 (e.g., a cellular communication module, a short-range wireless communication module, or a global navigation satellite system (GNSS) communication module) or a wired communication module 194 (e.g., a local area network (LAN) communication module or a power line communication (PLC) module). A corresponding one of these communication modules may communicate with the external electronic device via the first network 198 (e.g., a short-range communication network, such as Bluetooth™, wireless-fidelity (Wi-Fi) direct, or infrared data association (IrDA)) or the second network 199 (e.g., a long-range communication network, such as a cellular network, the Internet, or a computer network (e.g., LAN or wide area network (WAN)). These various types of communication modules may be implemented as a single component (e.g., a single chip), or may be implemented as multi components (e.g., multi chips) separate from each other. The wireless communication module 192 may identify and authenticate the electronic device 101 in a communication network, such as the first network 198 or the second network 199, using subscriber information (e.g., international mobile subscriber identity (IMSI)) stored in the subscriber identification module 196.

The antenna module 197 may transmit or receive a signal or power to or from the outside (e.g., the external electronic device) of the electronic device 101. According to an embodiment, the antenna module 197 may include an antenna including a radiating element composed of a conductive material or a conductive pattern formed in or on a substrate (e.g., PCB). According to an embodiment, the antenna module 197 may include a plurality of antennas. In such a case, at least one antenna appropriate for a communication scheme used in the communication network, such as the first network 198 or the second network 199, may be selected, for example, by the communication module 190 (e.g., the wireless communication module 192) from the plurality of antennas. The signal or the power may then be transmitted or received between the communication module 190 and the external electronic device via the selected at least one antenna. According to an embodiment, another component (e.g., a radio frequency integrated circuit (RFIC)) other than the radiating element may be additionally formed as part of the antenna module 197.

At least some of the above-described components may be coupled mutually and communicate signals (e.g., commands or data) therebetween via an inter-peripheral communication scheme (e.g., a bus, general purpose input and output (GPIO), serial peripheral interface (SPI), or mobile industry processor interface (MIPI)).

According to an embodiment, commands or data may be transmitted or received between the electronic device 101 and the external electronic device 104 via the server 108 coupled with the second network 199. Each of the electronic devices 102 and 104 may be a device of a same type as, or a different type, from the electronic device 101. According to an embodiment, all or some of operations to be executed at the electronic device 101 may be executed at one or more of the external electronic devices 102, 104, or 108. For example, if the electronic device 101 should perform a function or a service automatically, or in response to a request from a user or another device, the electronic device 101, instead of, or in addition to, executing the function or the service, may request the one or more external electronic devices to perform at least part of the function or the service. The one or more external electronic devices receiving the request may perform the at least part of the function or the service requested, or an additional function or an additional service related to the request, and transfer an outcome of the performing to the electronic device 101. The electronic device 101 may provide the outcome, with or without further processing of the outcome, as at least part of a reply to the request. To that end, a cloud computing, distributed computing, or client-server computing technology may be used, for example.

The electronic device according to certain embodiments may be one of various types of electronic devices. The electronic devices may include, for example, a portable communication device (e.g., a smartphone), a computer device, a portable multimedia device, a portable medical device, a camera, a wearable device, or a home appliance. According to an embodiment of the disclosure, the electronic devices are not limited to those described above.

It should be appreciated that certain embodiments of the disclosure and the terms used therein are not intended to limit the technological features set forth herein to particular embodiments and include various changes, equivalents, or replacements for a corresponding embodiment. With regard to the description of the drawings, similar reference numerals may be used to refer to similar or related elements. It is to be understood that a singular form of a noun corresponding to an item may include one or more of the things, unless the relevant context clearly indicates otherwise. As used herein, each of such phrases as "A or B," "at least one of A and B," "at least one of A or B," "A, B, or C," "at least one of A, B, and C," and "at least one of A, B, or C," may include any one of, or all possible combinations of the items enumerated together in a corresponding one of the phrases. As used herein, such terms as "1st" and "2nd," or "first" and "second" may be used to simply distinguish a corresponding component from another, and does not limit the components in other aspect (e.g., importance or order). It is to be understood that if an element (e.g., a first element) is referred to, with or without the term "operatively" or "communicatively", as "coupled with," "coupled to," "connected with," or "connected to" another element (e.g., a second element), it means that the element may be coupled with the other element directly (e.g., wiredly), wirelessly, or via a third element.

As used herein, the term "module" may include a unit implemented in hardware, software, or firmware, and may interchangeably be used with other terms, for example, "logic," "logic block," "part," or "circuitry". A module may be a single integral component, or a minimum unit or part thereof, adapted to perform one or more functions. For example, according to an embodiment, the module may be implemented in a form of an application-specific integrated circuit (ASIC).

As used herein, the term "processor" may include the singular and plural context. The term "memory" may also refer to a system of memory, including one or more non-contiguous memory chips or drives.

Certain embodiments as set forth herein may be implemented as software stored in memory (e.g., the program 140) including one or more instructions that are stored in a storage medium (e.g., internal memory 136 or external memory 138) that is readable by a machine (e.g., the electronic device 101). For example, a processor (e.g., the processor 120) of the machine (e.g., the electronic device 101) may fetch at least one of the one or more instructions stored in the storage medium, and execute it, with or without using one or more other components under the control of the processor. This allows the machine to be operated to perform at least one function according to the at least one fetched instruction. The one or more instructions may include a code generated by a complier or a code executable by an interpreter. The machine-readable storage medium may be provided in the form of a non-transitory storage medium. Wherein, the term "non-transitory" simply means that the storage medium is a tangible device, and does not include a signal (e.g., an electromagnetic wave), but this term does not differentiate between where data is semi-permanently stored in the storage medium and where the data is temporarily stored in the storage medium.

According to an embodiment, a method according to certain embodiments of the disclosure may be included and provided in a computer program product. The computer program product may be traded as a product between a seller and a buyer. The computer program product may be distributed in the form of a machine-readable storage medium (e.g., compact disc read only memory (CD-ROM)), or be distributed (e.g., downloaded or uploaded) online via an application store (e.g., PlayStore™), or between two user devices (e.g., smart phones) directly. If distributed online, at least part of the computer program product may be temporarily generated or at least temporarily stored in the machine-readable storage medium, such as memory of the manufacturer's server, a server of the application store, or a relay server.

According to certain embodiments, each component (e.g., a module or a program) of the above-described components may include a single entity or multiple entities. According to certain embodiments, one or more of the above-described components may be omitted, or one or more other components may be added. Alternatively or additionally, a plurality of components (e.g., modules or programs) may be integrated into a single component. In such a case, according to certain embodiments, the integrated component may still perform one or more functions of each of the plurality of components in the same or similar manner as they are performed by a corresponding one of the plurality of components before the integration. According to certain embodiments, operations performed by the module, the program, or another component may be carried out sequentially, in parallel, repeatedly, or heuristically, or one or more of the operations may be executed in a different order or omitted, or one or more other operations may be added.

Software Architecture

FIG. 2 is a block diagram 200 illustrating the program 140 according to certain embodiments. According to an embodiment, the program 140 may include an operating system (OS) 142 to control one or more resources of the electronic device 101, middleware 144, or an application 146 executable in the OS 142. The OS 142 may include, for example, Android™, iOS™, Windows™, Symbian™, Tizen™, or Bada™. At least part of the program 140, for example, may be pre-loaded on the electronic device 101 during manufacture, or may be downloaded from or updated by an external electronic device (e.g., the electronic device 102 or 104, or the server 108) during use by a user.

The OS 142 may control management (e.g., allocating or deallocation) of one or more system resources (e.g., process, memory, or power source) of the electronic device 101. The OS 142, additionally or alternatively, may include one or more driver programs to drive other hardware devices of the electronic device 101, for example, the input device 150, the sound output device 155, the display device 160, the audio module 170, the sensor module 176, the interface 177, the haptic module 179, the camera module 180, the power management module 188, the battery 189, the communication module 190, the subscriber identification module 196, or the antenna module 197.

The middleware 144 may provide various functions to the application 146 such that a function or information provided from one or more resources of the electronic device 101 may be used by the application 146. The middleware 144 may include, for example, an application manager 201, a window manager 203, a multimedia manager 205, a resource manager 207, a power manager 209, a database manager 211, a package manager 213, a connectivity manager 215, a notification manager 217, a location manager 219, a graphic manager 221, a security manager 223, a telephony manager 225, or a voice recognition manager 227.

The application manager 201, for example, may manage the life cycle of the application 146. The window manager 203, for example, may manage one or more graphical user interface (GUI) resources that are used on a screen. The multimedia manager 205, for example, may identify one or more formats to be used to play media files, and may encode or decode a corresponding one of the media files using a codec appropriate for a corresponding format selected from the one or more formats. The resource manager 207, for example, may manage the source code of the application 146 or a memory space of the memory 130. The power manager 209, for example, may manage the capacity, temperature, or power of the battery 189, and determine or provide related information to be used for the operation of the electronic device 101 based at least in part on corresponding information of the capacity, temperature, or power of the battery 189. According to an embodiment, the power manager 209 may interwork with a basic input/output system (BIOS) (not shown) of the electronic device 101.

The database manager 211, for example, may generate, search, or change a database to be used by the application 146. The package manager 213, for example, may manage installation or update of an application that is distributed in the form of a package file. The connectivity manager 215, for example, may manage a wireless connection or a direct connection between the electronic device 101 and the external electronic device. The notification manager 217, for example, may provide a function to notify a user of an occurrence of a specified event (e.g., an incoming call, message, or alert). The location manager 219, for example, may manage locational information on the electronic device 101. The graphic manager 221, for example, may manage one or more graphic effects to be offered to a user or a user interface related to the one or more graphic effects.

The security manager 223, for example, may provide system security or user authentication. The telephony manager 225, for example, may manage a voice call function or a video call function provided by the electronic device 101. The voice recognition manager 227, for example, may transmit a user's voice data to the server 108, and receive, from the server 108, a command corresponding to a function to be executed on the electronic device 101 based at least in part on the voice data, or text data converted based at least in part on the voice data. According to an embodiment, the middleware 244 may dynamically delete some existing components or add new components. According to an embodiment, at least part of the middleware 144 may be included as part of the OS 142 or may be implemented as another software separate from the OS 142.

The application 146 may include, for example, a home 251, dialer 253, short message service (SMS)/multimedia messaging service (MMS) 255, instant message (IM) 257, browser 259, camera 261, alarm 263, contact 265, voice recognition 267, email 269, calendar 271, media player 273, album 275, watch 277, health 279 (e.g., for measuring the degree of workout or biometric information, such as blood sugar), or environmental information 281 (e.g., for measuring air pressure, humidity, or temperature information) application. According to an embodiment, the application 146 may further include an information exchanging application (not shown) that is capable of supporting information exchange between the electronic device 101 and the external electronic device. The information exchange application, for example, may include a notification relay application adapted to transfer designated information (e.g., a call, message, or alert) to the external electronic device or a device management application adapted to manage the external electronic device. The notification relay application may transfer notification information corresponding to an occurrence of a specified event (e.g., receipt of an email) at another application (e.g., the email application 269) of the electronic device 101 to the external electronic device. Additionally or alternatively, the notification relay application may receive notification information from the external electronic device and provide the notification information to a user of the electronic device 101.

The device management application may control the power (e.g., turn-on or turn-off) or the function (e.g., adjustment of brightness, resolution, or focus) of the external electronic device or some component thereof (e.g., a display device or a camera module of the external electronic device). The device management application, additionally or alternatively, may support installation, delete, or update of an application running on the external electronic device.

FIG. 3A illustrates the appearance of an electronic device according to certain embodiments. The electronic device 300 can include a display 310 generally defining one surface and a rear surface separated by a certain depth or thickness from the display 310. The display 310 and the rear surface can be separated by a side surface 301. The electronic device 300 can also include a recess 355 shaped to receive a stylus pen 350. In certain embodiments, the stylus pen 350 can include a button acting as an ejection member 352 for releasing the stylus pen 350 from the recess 355.

An electronic device 300 according to certain embodiments may be implemented as a known portable electronic device such as a smartphone. The implementation of the electronic device 300 is not limited to the example shown in FIG. 3A, and certain embodiments of the disclosure may be applied to various kinds of electronic devices (e.g., portable multimedia devices, portable medical devices, cameras, etc.) including a stylus pen 350. The electronic device 300 may include at least some of the configuration and/or functions of the electronic device 101 shown in FIG. 1, and may include a structure for receiving the stylus pen 350.

Referring to FIG. 3A, a display 310 may be disposed on the front surface of a housing of the electronic device 300. The display 310 may be a touch screen display 310, and a touch sensor may be disposed on the back surface of the display 310, or the display 310 and the touch sensor may be integrally provided. Various elements, such as a receiver, a sensor, a home button, and the like may be provided in an area {for example, a black matrix (BM) area} other than the area in which the display 310 is disposed on the front surface of the electronic device 300.

According to certain embodiments, the electronic device 300 may include a stylus pen 350. The stylus pen 350 may be used to perform touch input on the touch screen of the electronic device 300. For example, the display 310 can display various graphical objects in a user interface. The stylus pen 350 can be used to select a particular graphical object on the display 310.

According to certain embodiments, the electronic device 300 may have a recess 355 provided in a portion of the housing of the electronic device (e.g., a portion of the side surface 301 thereof). The electronic device 300 may include a storage space leading to the recess 355, and the stylus pen 350 may be inserted into the storage space. The recess 355 may have a thin and elongate shape conforming to the shape of the stylus pen 350 so that the stylus pen 350 is able to be inserted into or detached from the recess 355. The recess 355 may be provided at the lower end of the housing of the electronic device 300, but is not limited thereto, and configuration may be made such that the stylus pen 350 is inserted inwards from the top or the side of the electronic device 300.

According to the illustrated embodiment, the stylus pen 350 may include a pressable button 352 (or an ejection member) at one end thereof so as to facilitate the removal of the stylus pen 350 from the recess 355 of the electronic device 300. If the button 352 is pressed, a reaction mechanism (e.g., at least one spring) associated with the button 352 may operate to release the stylus pen 350 from the recess 355.

Figure 3B:
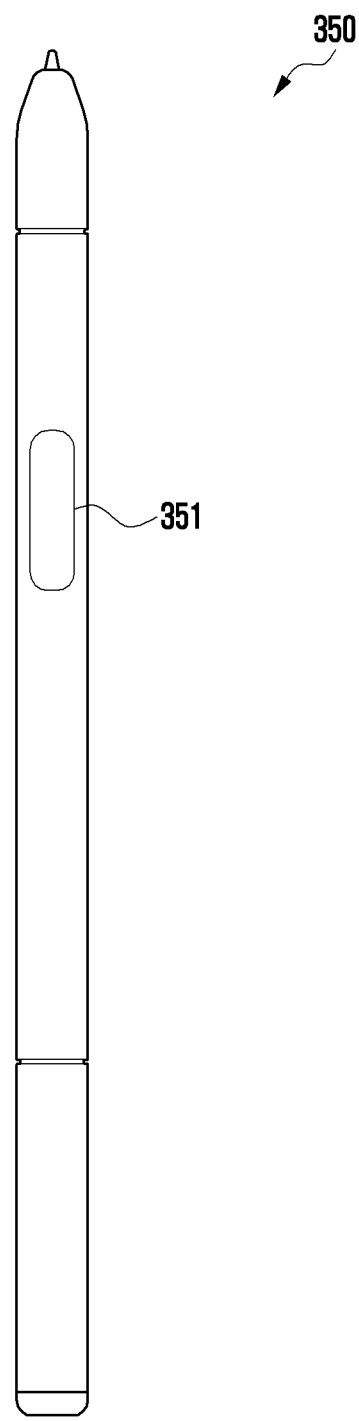
FIG. 3B illustrates the appearance of a stylus pen according to certain embodiments.

FIG. 3B illustrates the appearance of a stylus pen 350 according to certain embodiments.

As shown in FIG. 3B, the stylus pen 350 has a thin and elongate body overall, and may be inserted into and detached from a recess 355 formed in a portion of the housing of the electronic device 300.

According to certain embodiments, the stylus pen 350 may include at least one button 351. The button 351 may be exposed to the outside through an opening in the side surface of a housing of the stylus pen 350, and may be supported by a support member (not shown). Accordingly, if there is no external force acting on the button 351, the support member may provide elastic restoring force, thereby restoring the button 351 to a predetermined position or maintaining the button there. Although only a single button 351 is illustrated in FIG. 3B, the stylus pen 350 may include two or more buttons.

The stylus pen 350 may include a battery (not shown), and the battery of the stylus pen 350 may be charged using power from the electronic device 300 in a wired and/or wireless charging manner in the state in which the stylus pen 350 is inserted into the electronic device 300. The electronic device 300 may include a sensor for detecting the removal of the stylus pen 350, and if the stylus pen 350 is removed from the recess 355 of the electronic device 300, the electronic device 300 may perform an operation corresponding to the detachment (e.g., wireless communication connection, execution of a specific application, or the like).

According to certain embodiments, the electronic device 300 and the stylus pen 350 may be connected to each other through wireless communication {e.g., Bluetooth low energy (BLE)}. For example, if the stylus pen 350 is detached from the recess 355 of the electronic device 300, or if the stylus pen 350 is inserted into the recess 355 of the electronic device 300, the electronic device 300 may establish a wireless communication connection with the stylus pen 350. The stylus pen 350 may detect user input (e.g., button input, motion, sound, etc.) using the button 351 and/or various sensors, and may transmit, to the electronic device 300, a wireless signal corresponding to the user input using the wireless communication connection.

Figure 3C:
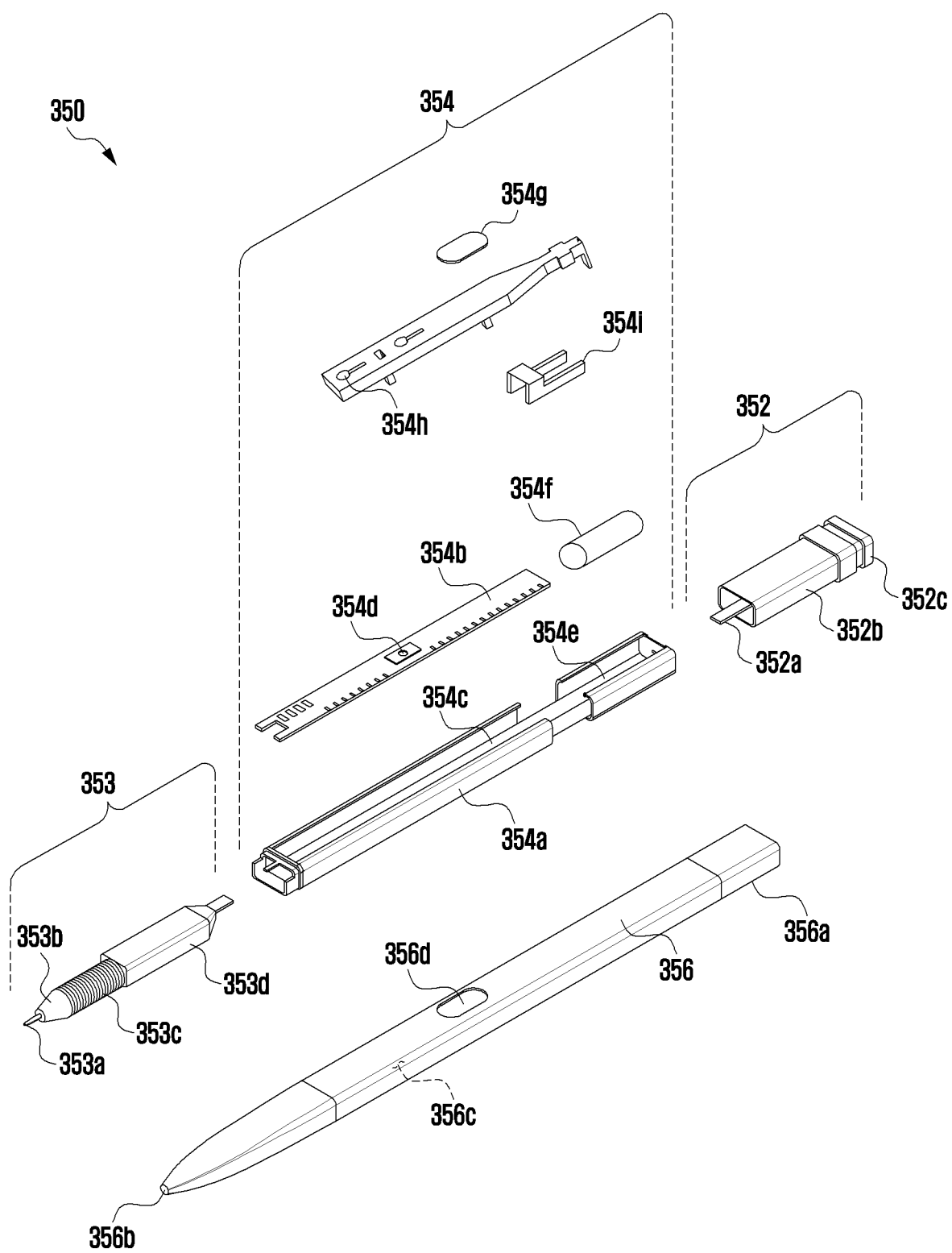
FIG. 3C is an exploded perspective view of a stylus pen according to certain embodiments.

FIG. 3C is an exploded perspective view of a stylus pen according to certain embodiments. Certain embodiments of the stylus pen 350 can include a housing 356, with coil portion 353, a circuit board portion 354, and an ejection member 352 disposed therein.

According to certain embodiments, a stylus pen 350 may include a pen housing 356 constituting the outer body of the stylus pen 350 and an inner assembly provided inside the pen housing 356. In the illustrated embodiment, the internal assembly may include all elements mounted inside the pen, and may be inserted into the pen housing 356 through a single assembly operation.

The pen housing 356 may have an elongate shape extending from a first end 356a to a second end 356b thereof, and may include a storage space 356c therein. The pen housing 356 may have an elliptical cross-section having a long axis and a short axis, and may be formed in an elliptical pillar shape overall. The storage space 356c of the electronic device 101 may also have an elliptical cross-section corresponding to the shape of the pen housing 356. The pen housing 356 may be made of a synthetic resin (e.g., plastic) and/or a metal material (e.g., aluminum). According to an embodiment, the second end 356b of the pen housing 356 may be made of a synthetic resin material.

The inner assembly may have an elongate shape corresponding to the shape of the pen housing 356. The inner assembly may be divided into three parts along the longitudinal direction thereof. For example, the inner assembly may include an ejection member 352 disposed at a position corresponding to the first end 356a of the pen housing 356, a coil portion 353 disposed at a position corresponding to the second end 356b of the pen housing 356, and a circuit board portion 354 disposed at a position corresponding to the body of the housing.

The ejection member 352 may include a configuration for taking the stylus pen 350 out of the storage space 112 of the electronic device 101. According to an embodiment, the ejection member 352 may include a shaft 352a, an ejection body 352b disposed around the shaft 352a so as to form the overall appearance of the ejection member 352, and a button portion 352c. If the inner assembly is fully inserted into the pen housing 356, the portion including the shaft 352a and the ejection body 352b is surrounded by the first end 356a of the pen housing 356, and the button portion 354c (e.g., 201a in FIG. 2) may be exposed to the outside of the first end 356a. A plurality of components, such as cam members or elastic members, which are not shown, may be disposed inside the ejection body 352b so as to form a push-pull structure. In an embodiment, the button portion 352c may be substantially coupled to the shaft 352a so as to perform a linear reciprocating motion with respect to the ejection body 352b. According to certain embodiments, the button portion 352c may include a button on which a hooking structure is formed so that a user may pull out the stylus pen 350 using a nail. According to an embodiment, the stylus pen 350 may include a sensor for detecting linear reciprocating motion of the shaft 352a, thereby providing another input method.

The coil portion 353 may include a pen tip 353a that is exposed to the outside of the second end 356b if the inner assembly is fully inserted into the pen housing 356, a packing ring 353b, coils 353c wound a plurality of times, and/or a pen pressure sensing unit 353d for obtaining a change in pressure according to the pressing of the pen tip 353a. The packing ring 353b may be made of epoxy, rubber, urethane, or silicone. The packing ring 353b may be provided for the purposes of waterproofing and dustproofing, and may protect the coil portion 353 and the circuit board portion 354 from water or dust. According to an embodiment, the coil 353c may produce a resonant frequency in a configured frequency band (e.g., 500 kHz), and may be combined with at least one device (e.g., a capacitor), thereby adjusting the resonance frequency produced by the coil 353c within a predetermined range.

The circuit board portion 354 may include a printed circuit board 354b, a base 354a surrounding at least one surface of the printed circuit board 354b, and an antenna. According to an embodiment, a substrate receiving portion 354c, in which the printed circuit board 354b is placed, may be formed in the upper surface of the base 354a, and the printed circuit board 354b may be placed on the substrate receiving portion 354c to then be fixed. According to an embodiment, the printed circuit board 354b may have an upper surface and a lower surface. A variable capacitor or switch 354d connected to the coil 353c may be disposed on the upper surface of the printed circuit board 354b, and a charging circuit, a battery, or a communication circuit may be disposed on the lower surface thereof. The battery may include an electric double layered capacitor (EDLC). The charging circuit may be located between the coil 353c and the battery, and may include a voltage detector circuit and a rectifier.

The antenna may include an antenna structure 354i as shown in FIG. 3C and/or an antenna embedded in the printed circuit board 354b. According to certain embodiments, a switch 354d may be provided on the printed circuit board 354b. A side button 354g provided in the stylus pen 350 may be used to press the switch 354d, and may be exposed to the outside through the side opening 356d in the pen housing 356. The side button 354g may be supported by a support member 354h, and if there is no external force acting on the side button 354g, the support member 354h provides elastic restoring force, thereby restoring the side button 354g to a predetermined position or maintaining the side button 354g there.

The circuit board portion 354 may include another packing ring such as an O-ring. For example, O-rings made of an elastic material may be provided at both ends of the base 354a, thereby providing a sealing structure between the base 354a and the pen housing 356. In some embodiments, the support member 354h may come into close contact, in part, with the inner wall of the pen housing 356 around the side opening 356d, thereby providing a sealing structure. For example, the circuit board portion 354 may also provide a waterproof and dustproof structure similar to the packing ring 353b of the coil portion 353.

The stylus pen 350 may include a battery seating portion 354e, on which a battery 354f is placed, on the upper surface of the base 354a. The battery 354f, which may be mounted on the battery seating portion 354e, may include, for example, a cylinder type battery.

The stylus pen 350 may include a microphone (not shown). The microphone may be directly connected to the printed circuit board 354b, or may be connected to a separate flexible printed circuit board (FPCB) (not shown) that is connected to the printed circuit board 354b. According to certain embodiments, the microphone may be disposed in the longitudinal direction of the stylus pen 350 so as to be parallel to the side button 354g.

Figure 4:
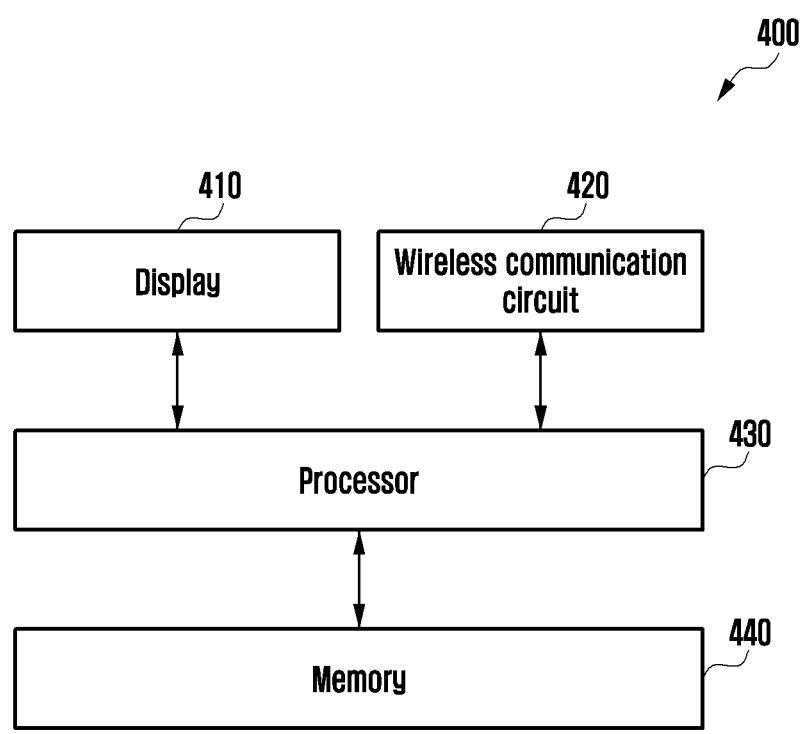
FIG. 4 is a block diagram of an electronic device according to certain embodiments.

FIG. 4 is a block diagram of an electronic device according to certain embodiments.

As shown in the drawing, an electronic device 400 may include a display 410, a wireless communication circuit 420, a processor 430, and a memory 440. It shall be understood that in certain embodiments there may be additional elements, or some of the foregoing elements can be omitted. The electronic device 400 may be implemented in the same form as the electronic device 300 in FIG. 3A, and may further include at least some of the elements and/or functions of the electronic device 101 shown in FIG. 1. At least some of the elements illustrated in FIG. 4 and/or other elements (not shown) of the electronic device 400 (e.g., the wireless communication circuit 420, the processor 430, the memory 440, etc.) may be provided inside a housing (not shown), and at least some others thereof (e.g., the display 410 and the like) may be exposed to the outside of the housing.

According to certain embodiments, the display 410 may display an image, and may be implemented as one of various types of displays such as a liquid crystal display (LCD), an organic light-emitting diode (OLED) display, or the like. The display 410 may include at least some of the configuration and/or functions of the display device 160 shown in FIG. 1. The display 410 may be exposed to the outside through a portion (e.g., a front surface) of the housing of the electronic device 400.

The display 410 may be a touch screen display, and may detect a touch or hovering (or proximity touch) input using a user's finger (or another body part) or a stylus pen.

According to certain embodiments, the wireless communication circuit 420 may establish a wireless communication connection with the stylus pen, such as stylus pen 350. The wireless communication circuit 420 may communicate with a second wireless communication circuit 520 of the stylus pen using at least one of various types of short-range wireless communication. For example, the wireless communication circuit 420 may perform communication using Bluetooth low energy (BLE), but is not limited thereto. In certain embodiments, the wireless communication circuit 420 may use Near Field Communication (NFC). The wireless communication circuit 420 may be disposed inside the housing of the electronic device 400.

According to certain embodiments, the electronic device 400 may further include a wireless communication module (e.g., the wireless communication module 192 in FIG. 1) for supporting other types of wireless communication, such as Wi-Fi or cellular communication, in addition to the wireless communication circuit 420 supporting short-range wireless communication such as BLE.

According to certain embodiments, the stylus pen has a thin and elongate shape overall, as shown in FIG. 3B, and may be inserted into a recess (e.g., the recess 355 in FIG. 3A) of the electronic device 400 so as to be detachable therefrom.

According to certain embodiments, the stylus pen may detect a user input using the stylus pen in the state in which the stylus pen is detached from the electronic device 400 to be located within a distance from the display 410, and may provide the detection to the wireless communication circuit 420 of the electronic device 400 through wireless communication.

The wireless communication circuit 420 may establish wireless communication with the stylus pen (e.g., the second wireless communication circuit 520) if the stylus pen is detached from the recess of the electronic device 400 or in response to user selection performed on a menu provided in the electronic device 400. If the stylus pen is detached from the recess of the electronic device 400, the processor 430 may directly execute an application (e.g., a memo application, a camera application, etc.) specified by a manufacturer and/or a user.

The configuration and/or functions of the stylus pen will be described in more detail below with reference to FIG. 5.

According to certain embodiments, the memory 440 may include a known volatile memory and non-volatile memory, but the disclosure is not limited to any specific kind of memory. The memory 440 may include at least some of the configuration and/or functions of the memory 130 shown in FIG. 1. In addition, the memory 440 may store at least some of the programs 140 shown in FIG. 1 and/or the programs 140 shown in FIG. 2.

The memory 440 may be operatively and/or electrically connected to the processor 430, and may store various instructions that can be executed by the processor 430. The instructions may include arithmetic and logical operations, which can be recognized by the processor 430, data movement, and control instructions such as input/output.

The memory 440 may be provided inside the housing of the electronic device 400.

According to certain embodiments, the processor 430 may be configured to perform operation or data processing in relation to control and/or communication of the respective elements of the electronic device 400, and may include at least some of the configuration and/or functions of the processor 120 shown in FIG. 1. The processor 430 may be operatively and/or electrically connected to internal elements of the electronic device 400, such as the display 410, the wireless communication circuit 420, and the memory 440.

Although the operation and data processing functions performed by the processor 430 of the electronic device 400 are not limited, in the specification, certain embodiments to process operations of executing an application to display a user interface of the application on the display 410 and, based on a user input using a stylus pen in a mapping mode, mapping the user input to a function executed by the electronic device 400 will be described. Operations of the processor 430, which will be described later, may be performed by loading instructions stored in the memory 440.

According to certain embodiments, the processor 430 may execute an application, thereby displaying a user interface provided by the application on the display 410. The application described herein is not limited to any specific type, and various applications, such as a web browser, a game application, a memo application, or the like, may be executed by the electronic device 400.

According to certain embodiments, the processor 430 may execute a function on the user interface, which is mapped to a user input using a stylus pen. The user input using the stylus pen and the function on the user interface may be mapped to each other in advance by the manufacturer of the electronic device 400 or an application developer, or may be directly mapped by a user as will be described later in certain embodiments.

For example, in the case where a shooting button of a camera application is mapped to a button input (e.g., a single-click input) of a stylus pen according to a function mapped by a manufacturer of the electronic device 400, if a user performs a single-click input on the button of the stylus pen while the camera application is running, the same function as touching the shooting button (e.g., image capturing) may be executed.

According to certain embodiments, the processor 430 may provide an environment for a user to map a user input using the stylus pen with a function on the user interface. In the specification, such an environment will be referred to as a "mapping mode".

According to certain embodiments, if a user input is received from the stylus pen while a user interface of an application is being displayed, the processor 430 may identify whether or not there is a function mapped to the user input. If there is a function mapped to the user input, the processor 430 may directly execute the mapped function.

If there is no function mapped to the user input, the processor 430 may switch to a mapping mode, thereby providing a user interface in the mapping mode through the display 410. According to another embodiment, the electronic device 400 may provide a separate setting menu for entering the mapping mode. According to another embodiment, if a predetermined user input with respect to the stylus pen (e.g., a single-click input or a long-click input) is received in the state in which the stylus pen is located at a distance from the electronic device 400, the electronic device 400 may switch to the mapping mode.

A user interface provided in the process of entering the mapping mode will be described in more detail with reference to FIGS. 10A and 10B.

According to certain embodiments, the processor 430 may display a user interface on the display 410 in the mapping mode, and may detect contact (touch) or proximity (hovering) of a stylus pen for selecting one of the displayed functions. At least some of the user interface of the application, which was previously displayed, may be displayed without change even in the mapping mode, and the user may place the stylus pen on the object to be mapped to a user input using the stylus pen (e.g., touch or hovering), thereby selecting the object.

According to certain embodiments, the processor 430 may receive a user input (e.g., a first user input) using the stylus pen while the stylus pen is touching or hovering over the object. The user input may be a button input, and examples of the user input will be described in detail with reference to FIG. 5. In response to the user input, the processor 430 may map a selected function to the input through the stylus pen, and may store the same in the memory 440.

According to certain embodiments, the processor 430 may provide various user interfaces for selecting a function to be mapped to a user input using a stylus pen in the mapping mode. For example, the processor 430 may provide at least one piece of accessibility node information, shortcut key information, application shortcut information, or application link information, which is supported by an application, through a user interface. Embodiments thereof will be described in more detail with reference to FIGS. 6 to 9.

Accordingly, the electronic device 400 may allow the user to directly map a new function to a user input of the stylus pen according to the state of the user interface, as well as simply executing a predetermined function using the stylus pen.

According to certain embodiments, the processor 430 may receive a user input (e.g., a second user input) using the stylus pen through the wireless communication circuit 420 while an application executed after the mapping mode ends (e.g., in a normal mode) is being displayed on the display 410. The processor 430 may identify a function mapped to the user input, and may execute the mapped function.

According to certain embodiments, if there is a function mapped to the user input using the stylus pen on the user interface, the processor 430 may display guidance information for providing guidance for use of the function. In order for the user to recognize an object (e.g., an icon) mapped to a user input, the guidance information may be displayed adjacent to or overlaid on the object, and may include a visual element to help the user recognize the type of user input (e.g., a single-click input, a double-click input, a long-click input, etc.). The guidance information will be described in more detail with reference to FIGS. 6E, 7C, and others.

Figure 5:
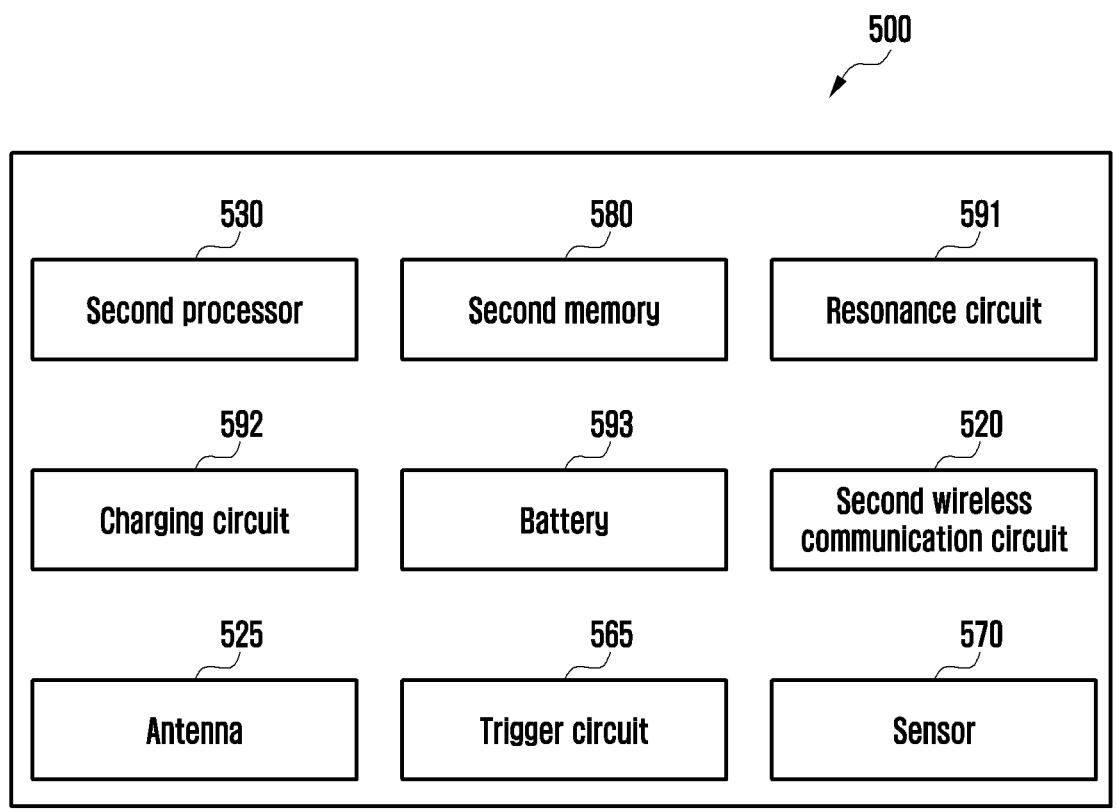
FIG. 5 is a block diagram of a stylus pen according to certain embodiments.

FIG. 5 is a block diagram of a stylus pen according to certain embodiments.

Referring to FIG. 5, a stylus pen 500 may include a second wireless communication circuit 520, a second processor 530, at least one sensor 570, a second memory 580, a resonance circuit 591, a charging circuit 592, a battery 593, an antenna 525, and a trigger circuit 565, and certain embodiments of the disclosure may be implemented even if at least some of the illustrated elements are omitted or replaced. The stylus pen 500 may have the same form as the stylus pen 350 in FIG. 3B and/or the stylus pen 350 in FIG. 3C. In some embodiments, the second processor 530, at least a portion of the resonance circuit 591, and/or at least a portion of the second wireless communication circuit 520 may be configured as a chip on a printed circuit board. The second processor 530, the resonance circuit 591, and/or the second wireless communication circuit 520 may be electrically connected to the second memory 580, the charging circuit 592, the battery 593, the antenna 525, or the trigger circuit 565. The stylus pen 500 according to an embodiment may be configured with only a resonance circuit and a button.

According to certain embodiments, the second wireless communication circuit 520 is intended for communication with a wireless communication circuit (e.g., the wireless communication circuit 420 in FIG. 4) of the electronic device, and may support short-range wireless communication {e.g., Bluetooth, Bluetooth low energy (BLE), WLAN, etc.), which is the same as the wireless communication circuit. If the stylus pen 500 is detached from a recess of the electronic device (e.g., the recess 355 in FIG. 3), the second wireless communication circuit 520 may establish a wireless communication connection with the wireless communication circuit of the electronic device. The second wireless communication circuit 520 may transmit a wireless signal corresponding to a user input using a button and/or the sensor 570 to the electronic device.

According to certain embodiments, the second wireless communication circuit 520 may transmit state information and input information of the stylus pen 500 to the electronic device 101 using short-range communication. For example, the second wireless communication circuit 520 may transmit, to the electronic device 101, direction information (e.g., motion sensor data) of the stylus pen 500, which is obtained through the trigger circuit 565, voice information that is input through a microphone, or information on remaining power of the battery 593.

According to certain embodiments, the antenna 525 may be used to transmit or receive a signal or power to or from the outside (e.g., the electronic device 400). According to an embodiment, the stylus pen 500 may include a plurality of antennas 525, and may select at least one antenna 525 suitable for a communication scheme from among the antennas. The second wireless communication circuit 520 may exchange signals or power with an external electronic device through the at least one selected antenna 525.

According to certain embodiments, the trigger circuit 565 may include one or more buttons or a sensor circuit. According to an embodiment, the second processor 530 may identify an input method of the button of the stylus pen 500 (e.g., touching or pressing) or the type of button (e.g., an EMR button or a BLE button). According to an embodiment, the sensor circuit may produce an electrical signal or a data value corresponding to an internal operation state of the stylus pen 500 or an external environment state. For example, the sensor circuit may include at least one of a motion sensor, a battery level sensor, a pressure sensor, an optical sensor, a temperature sensor, a geomagnetic sensor, and a biometric sensor. According to an embodiment, the trigger circuit 565 may transmit a trigger signal to the electronic device 101 using an input signal of a button or a signal through a sensor.

According to certain embodiments, the second processor 530 may perform a function of controlling respective elements of the stylus pen 500. For example, in the state in which the stylus pen 500 is detached from a recess of the electronic device, the second processor 530 may provide, to the wireless communication circuit of the electronic device, a user input using a button and/or a motion input of the stylus pen 500, which is detected through the sensor 570, using the second wireless communication circuit 520.

According to certain embodiments, the second processor 530 may include a generic processor configured to execute a customized hardware module or software (e.g., an application program). The second processor 530 may include hardware elements (functions) or software elements (programs) including at least one of various sensors provided in the stylus pen 500, a data measuring module, an input/output interface, a module for managing the state or environment of the stylus pen 500, or a communication module. The second processor 530 may include, for example, hardware, software, firmware, or a combination thereof. According to an embodiment, the second processor 530 may receive a proximity signal corresponding to an electromagnetic field signal generated from the digitizer 160 of the electronic device 101 through the resonance circuit 591. If the proximity signal is identified, the second processor 530 may control the resonance circuit 591 so as to transmit an electromagnetic resonance (EMR) input signal to the electronic device (e.g., the electronic device 400 in FIG. 4).

According to certain embodiments, the second memory 580 may store information related to the operation of the stylus pen 500. For example, the information may include information for communication with the electronic device 400 and frequency information related to an input operation of the stylus pen 500.

According to certain embodiments, the resonance circuit 591 may include at least one of a coil, an inductor, or a capacitor. The resonance circuit 591 may be used by the stylus pen 500 to generate a signal including a resonance frequency. For example, the stylus pen 500 may use at least one of an electro-magnetic resonance (EMR) method, an active electrostatic (AES) method, or an electrically-coupled resonance (ECR) method for generation of the signal. In the case where the stylus pen 500 transmits a signal by the EMR method, the stylus pen 500 may generate a signal including a resonance frequency, based on an electromagnetic field generated from an inductive panel of the electronic device 400. In the case where the stylus pen 500 transmits a signal by the AES method, the stylus pen 500 may generate a signal using capacitive coupling with the electronic device 400. In the case where the stylus pen 500 transmits a signal by the ECR method, the stylus pen 500 may generate a signal including a resonance frequency, based on an electric field generated from a capacitive device of the electronic device 400. According to an embodiment, the resonance circuit 591 may be used to change the intensity or frequency of the electromagnetic field according to the user's manipulation state. For example, the resonance circuit 591 may provide a frequency for recognizing a hovering input, a drawing input, a button input, or an erasing input.

According to certain embodiments, if the charging circuit 592 is connected to the resonance circuit 591, based on a switching circuit, the charging circuit 592 may rectify a resonance signal generated by the resonance circuit 591 into a DC signal, thereby providing the same to the battery 593. According to an embodiment, the stylus pen 500 may identify whether or not the stylus pen 500 is inserted into the electronic device 400 using a voltage level of the DC signal detected by the charging circuit 592.

According to certain embodiments, the battery 593 may be configured to store power required for the operation of the stylus pen 500. The battery may include, for example, a lithium-ion battery, or a capacitor, and may be rechargeable or interchangeable. According to an embodiment, the battery 593 may be charged using power provided from the charging circuit 592 {e.g., a DC signal (DC power)}.

According to certain embodiments, the stylus pen 500 may include at least one button. The stylus pen 500 may include only one button as shown in FIG. 3B, or may include two or more buttons. If the stylus pen 500 includes two or more buttons, it is possible to perform simultaneous or sequential inputs through the respective buttons.

According to certain embodiments, the stylus pen 500 may include at least one sensor 570. Here, the sensor 570 may include a gyro sensor and an acceleration sensor, and may detect a motion input such as movement or manipulation of the stylus pen 500 by the user. In addition, the stylus pen 500 may include a microphone, thereby collecting surrounding sound, such as a user's voice, and may include a camera, thereby capturing surrounding images.

The user may perform various kinds of inputs on a display (or a touch screen) using the stylus pen 500. For example, a touch input provides a function in which the stylus pen 500 comes into direct contact with the display, thereby giving the same effect as a finger touch at the corresponding position, and a hovering input provides a function in which a tip of the stylus pen 500 hovers within a predetermined distance above the display without touching the display, thereby recognizing the position thereof and leading to various additional operations such as previewing an object of the user interface. Click-and-drag provides a function in which the user touches a specific point of the display using the stylus pen 500 or places the stylus pen 500 so as to hover thereover and drags the same to specify a partial area, thereby simultaneously selecting items within the specified area.

According to certain embodiments, in addition to the touch input and the hovering input, the user may receive a user input using a button and/or a sensor 570 in the state in which the stylus pen 500 is located at a distance from the display. For example, an input through a button may include a single-click input, a double-click input, or a long-click input onto the button, and a succession of multiple button inputs may also be defined as a single button input. In addition, the user may perform a motion input such as tilting or shaking the stylus pen 500, and the motion input may be detected by the sensor 570 (e.g., a gyro sensor, an acceleration sensor, or the like).

In this document, an input using a button will be described as an example of a user input. However, a user input using the stylus pen 500 is not limited to the above description, and may be performed in various input manners (e.g., recognition of user's facial expression using a camera of the stylus pen 500, a motion input, a voice input using a microphone of the stylus pen 500, and the like), which are known or may be implemented by a skilled person.

Figure 6A:
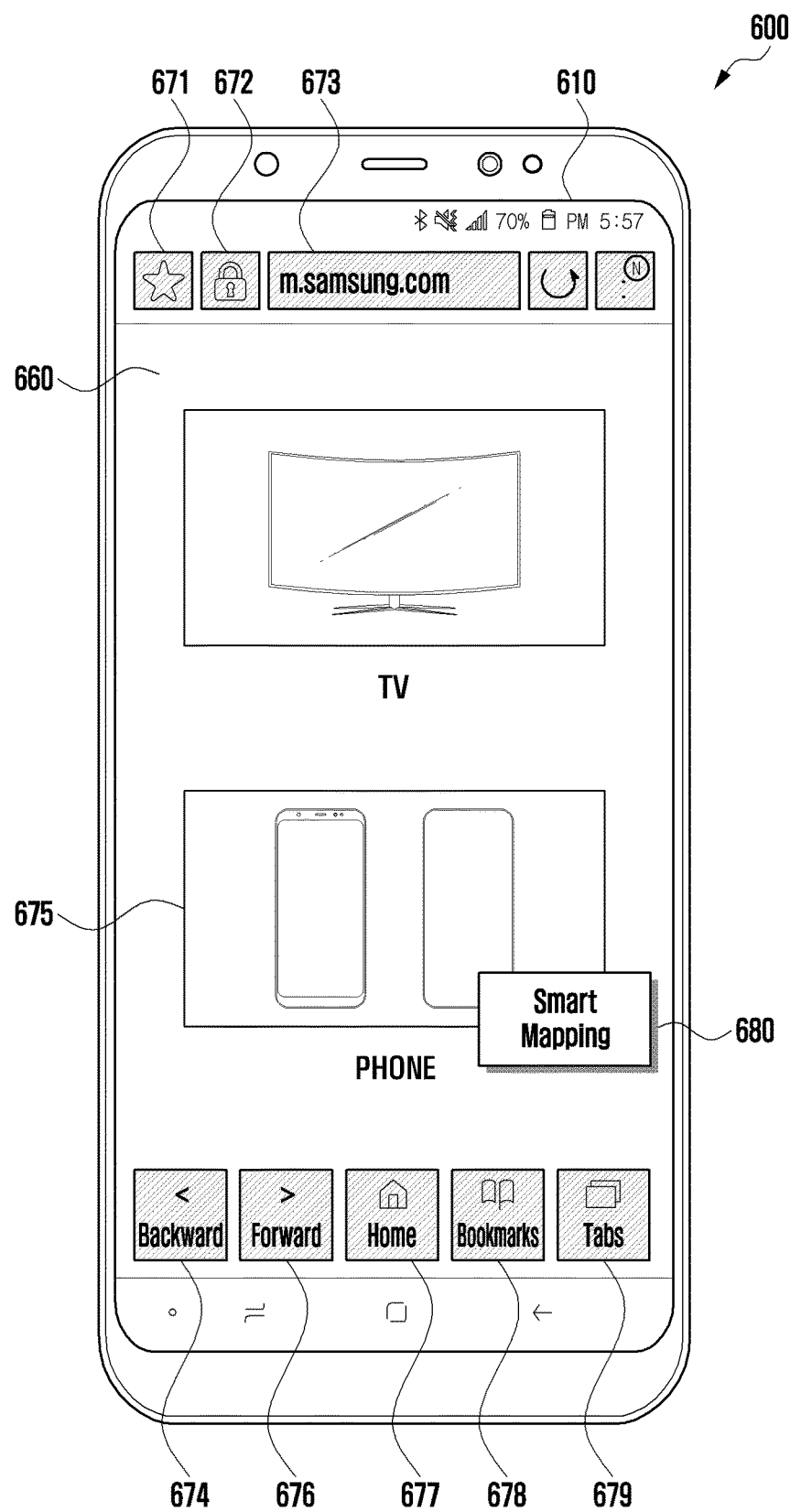
FIG. 6A illustrates an example of mapping a function of an electronic device to an operation of a stylus pen using an accessibility node according to certain embodiments.
Figure 6B:
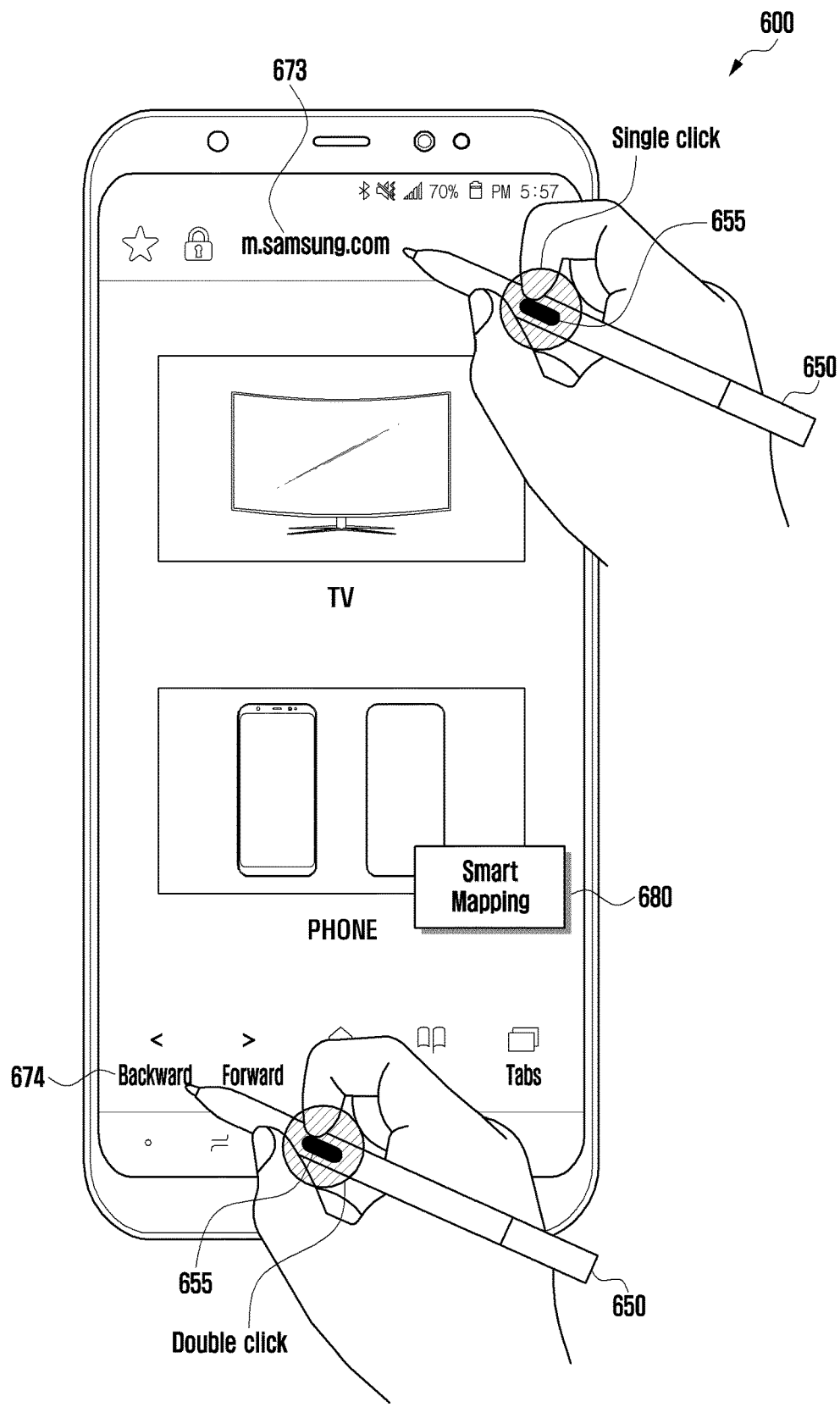
FIG. 6B illustrates an example of mapping a function of an electronic device to an operation of a stylus pen using an accessibility node according to certain embodiments.
Figure 6C:
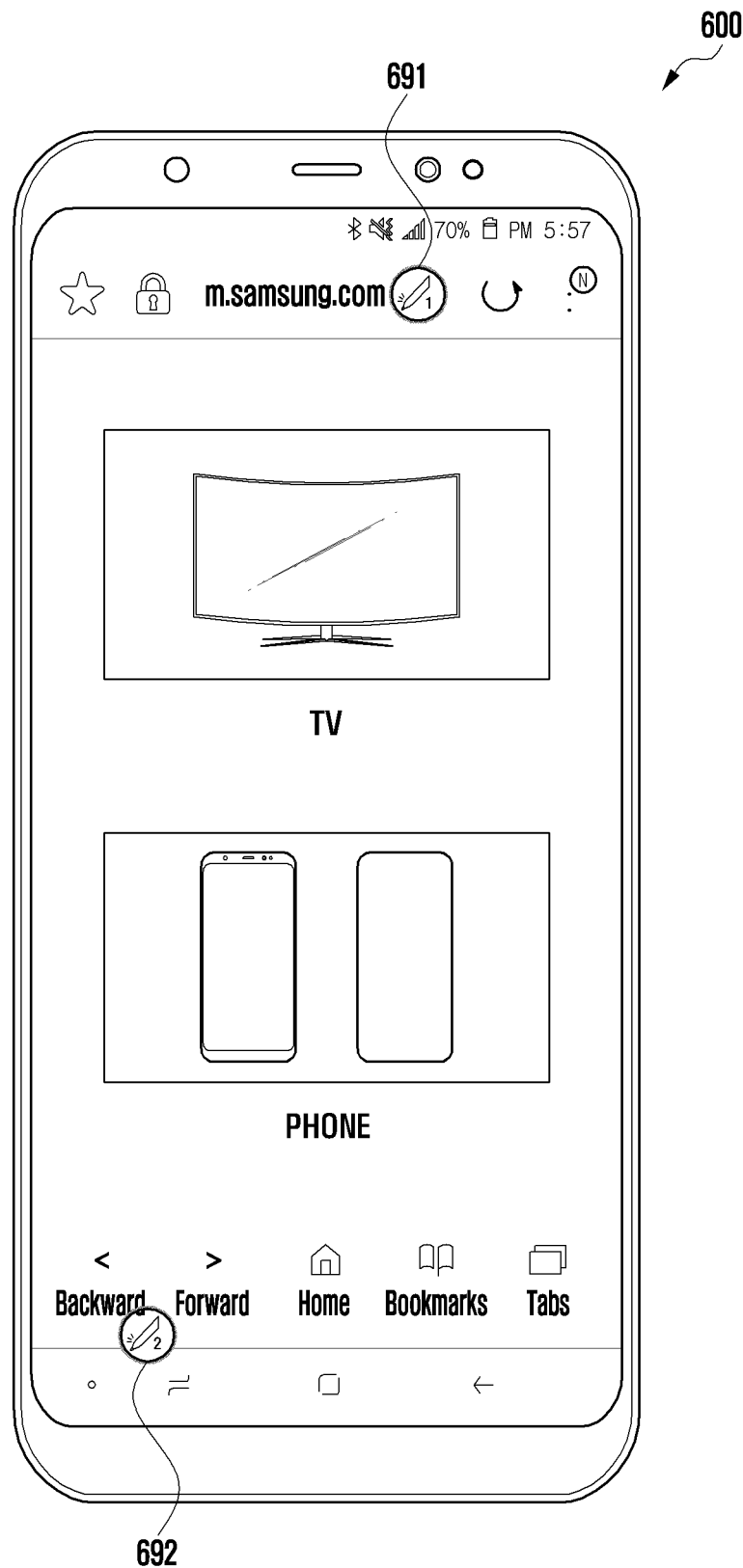
FIG. 6C illustrates an example of mapping a function of an electronic device to an operation of a stylus pen using an accessibility node according to certain embodiments.

FIG. 6A illustrates an example of mapping a function of an electronic device to an operation of a stylus pen using an accessibility node according to certain embodiments, FIG. 6B illustrates an example of mapping a function of an electronic device to an operation of a stylus pen using an accessibility node according to certain embodiments, and FIG. 6C illustrates an example of mapping a function of an electronic device to an operation of a stylus pen using an accessibility node according to certain embodiments.

According to certain embodiments, a processor (e.g., the processor 430 in FIG. 4) of an electronic device (e.g., the electronic device 400 in FIG. 4) may be configured to: identify one or more accessibility nodes 671 to 679 displayed in the foreground of the application; display the identified one or more accessibility nodes so as to distinguish the same from the rest of the user interface; receive a first user input using the stylus pen in the state in which the stylus pen (e.g., the stylus pen 450 in FIG. 4) is in contact with or in proximity to the display in order to select one of the one or more accessibility nodes; and map a function corresponding to the selected accessibility node to the first user input through the stylus pen, thereby storing the same in a memory (e.g., the memory 440 in FIG. 4).

Mapping Operation of Stylus to Accessibility Nodes of a Web Browser

FIG. 6A illustrates the state in which accessibility nodes 671 to 679 of a web browser application 660 are displayed in a mapping mode. The processor 430 may enter a mapping mode while the web browser application 660 is running, and, in the case of a mapping method using an accessibility node, the processor 430 may provide a user interface as shown in FIG. 6A.

In the mapping mode, the user can either use the stylus pen 350 to touch or hover over an object, e.g., accessibility node 671 to 679. FIG. 6A shows the user interface at the beginning of the mapping mode. The user can then make a user input having a selected stylus pen input type of the stylus pen input types that are available. Turning to FIG. 6B, for example, with the stylus pen 350 touched or hovered over a selected accessibility node, e.g., accessibility node 674 (or object, it is noted that while the embodiment shows accessibility nodes, any object or even location associated with the function, can be used in other embodiments) of accessibility nodes 671 to 679, if the user double clicks the button 351 on the stylus pen 350 over a particular accessibility node 671 to 679, the function corresponding to the selected accessibility node 674, e.g., "Backward", becomes mapped to the selected stylus pen input type, e.g., double-clicking. Although single clicking and double-clicking are used in the present embodiment, it is noted that the stylus pen input types and selected stylus pen input types are not limited to the foregoing, and can include other multiple buttons on the stylus pen, specific strokes of the stylus pen, or tapping, to name a few.

Later, when a second user input is received from the stylus pen, and the second input has the stylus pen input type of double-clicking, the electronic device will perform the function of "Backward", regardless of the location of the stylus pen. In fact, even if the stylus pen is contact or hovering over another accessibility node, e.g., accessibility node 676 corresponding to another function, e.g., "Forward", when the user double-clicks the button 351, the electronic device will perform the function "Backwards."

Additionally, the user can make a second user input while the stylus pen is in contact of hovers over another accessibility node (or another object, location) 673, having another selected type of stylus pen input types, e.g., single-click. The electronic device will map the function corresponding to accessibility node 673, e.g., placing a cursor inside box 673. Later, when a third user input is received, if the third user input is a double-click type of stylus pen input, the electronic device will perform the function "Backward," regardless of the location of the stylus pen (even if the stylus pen is in contact with accessibility node 673) If the third user input is a single-click type of stylus pen input, the electronic device will place a cursor inside box 673 regardless of the location of the stylus pen (even if the stylus pen is in connect with accessibility node 674). Turning to FIG. 6C, in certain embodiments, guidance information can be displayed proximate to the selected object on the display indicating the selected stylus pen input type. For example, guidance information 692 indicating a double-click stylus pen input type can be placed proximate to accessibility node 674, while guidance information 691 indicated a single-click stylus pen input type can be placed proximate to accessibility node 673.

A user interface in the process of entering the mapping mode and determining the mapping method will be described in more detail with reference to FIGS. 10A and 10B.

An electronic device 600 may analyze accessibility nodes with respect to a screen pertaining to an activity or a fragment currently executed in the foreground. For example, the electronic device (e.g., the program in FIG. 2) may include a framework by which the configuration of an application is able to be recognized (e.g., if a corresponding application has a means to pass a specification to a framework, such as the AndroidManifest file of an android framework, or a similar framework specification in the case of another OS), and the framework may obtain application information including information about the accessibility nodes from the application. FIG. 6A illustrates accessibility nodes including a bookmark button 671, a security button 672, a URL input window 673, a back button 674, web page information 675, a forward button 676, a home button 677, a bookmark button 678, and a tab button 679, which are currently displayed on the screen.

According to certain embodiments, the processor 430 may display the currently displayed accessibility nodes (or view nodes) of the user interface of the web browser application 660 by classifying and/or highlighting the accessibility nodes, thereby helping the user recognize the same. For example, as shown in FIG. 6A, the respective accessibility nodes 671 to 679 may be displayed to be in the state of being highlighted by boxes surrounding the same, or may by shaded.

According to certain embodiments, the processor 430 may display, on the user interface, mode information 680 indicating that the electronic device is currently in the mapping mode, and the mode information 680 may be removed if the mapping mode ends (or if the electronic device switches to the normal mode).

An example of view tree structure information and hierarchy structure information on the accessibility nodes shown in FIG. 6A is as follows.
(1) RelativeLayout [0,63] [1080,189]
  (0) LinearLayout [0,63] [1080,189]
    (0) LinearLayout [47,79] [1048,173]
      (0) FrameLayout [47,79] [943,173]
        (0) LinearLayout [47,79] [943,173]
          (0) ImageButton {Add to Bookmarks} [47,79] [131,173]
          (1) ImageButton {secure} [105,79] [210,173]
          (2) EditText:m.samsung.com {enter search term or URL} [189,79] [838,173]
          (3) ImageButton {refresh} [838,79] [943,173]
      (1) RelativeLayout [943,79] [1048,173]
  (1) View [0,188] [1080,2094]
  (2) LinearLayout [0,1947] [1080,2094]
    (0) LinearLayout [26,1947] [231,2094]

If the above view tree structure information is included, information related to the bookmark button 671, the security button 672, the URL input window 673, and the refresh button, which are accessibility nodes, is included.

The above-described framework may obtain application information including information about accessibility nodes from the web browser application.

Table 1 shows information about the URL input window among the accessibility nodes.

| | Node Detail |
|---|---|
| index | 2 |
| text | m.samsung.com |
| resource-id | com.sec.android.app.sbrowser:id/location_bar_edit_text |
| class | android.widget.EditText |
| package | com.sec.android.app.sbrowser |
| content-desc | Enter keyword or URL |
| checkable | false |
| checked | false |
| clickable | true |
| enabled | true |
| focusable | true |
| focused | false |
| scrollable | false |
| long-clickable | true |

Referring to Table 1, various attributes of the URL input window 673, among the accessibility nodes, are defined. Table 1 shows that the attributes "clickable" and "long-clickable" are "true", which may mean that the corresponding accessibility node can be selected by a click (a single touch) or a long click (a long touch). According to certain embodiments, the processor 430 may display an accessibility node, which can be selected by a touch input (or a hovering input), such as a click or a long click, among the accessibility nodes, so as to be distinguished from other accessibility nodes, or may display only the selectable accessibility nodes, among the plurality of accessibility nodes of the current user interface, by separating and/or highlighting the same, unlike FIG. 6A, thereby helping the user recognize the accessibility nodes.

FIG. 6B illustrates a process for a user to map a selected input type of one or more stylus pen input types to a function corresponding to an accessibility node.

The processor 430 may receive a user input (e.g., a first user input) using a stylus pen 650 while the stylus pen is touching or is hovering over one of the displayed accessibility nodes. For example, if a user performs a single-click input type on a button 655 of the stylus pen 650 while the stylus pen 650 is touching or is hovering over the URL input window 673, a second wireless communication circuit of the stylus pen 650 may transmit a wireless signal corresponding to the single-click input to the wireless communication circuit 420. The processor 430 may identify the user input, based on the received wireless signal, and may map the URL input window 673 (a function of the user interface) to the single click (a user input of the stylus pen 650), thereby storing the same in a memory (e.g., the memory 440 in FIG. 4).

In addition, if a user performs a double-click input type on the button 655 of the stylus pen 650 while the stylus pen 650 is touching or is hovering over the back button 674, the processor 430 may perform control such that the second wireless communication circuit of the stylus pen 650 (e.g., the second wireless communication circuit 520 in FIG. 5) transmits a wireless signal corresponding to the double-click input to the wireless communication circuit (e.g., the wireless communication circuit 420 in FIG. 4). The processor 430 may identify the user input, based on the received wireless signal, and may map the back button 674 (a function of the user interface) to the double-click input (a user input of the stylus pen 650), thereby storing the same in the memory 440.

According to certain embodiments, in the state in which the user places the stylus pen 650 on one of the accessibility nodes 671 through 679 in a mapping mode, the processor 430 may propose a user input suitable for the corresponding accessibility node. For example, if the bookmark button 671 has the attribute "long-clickable", the processor 430 may propose a "long-click input" for the button 655 if the user performs a touch input or a hovering input on the bookmark button 671 using the stylus pen 650. In addition, the processor 430 may propose a user input using at least one of "index", "text", "resource-id", "class", "package", "content-desc", "checkable", "checked", "clickable", "enabled", "focusable", "focused", "scrollable", and "long-clickable" of accessibility node information (e.g., the accessibility node information in Table 1). In this case, the proposal may be displayed in one area of the user interface as text or image information. Accordingly, the user may also assign, to the stylus pen 650, a user input (e.g., a long-click input on the button 655) corresponding to an attribute (e.g., "long-clickable") of an accessibility node of the user interface.

FIG. 6C illustrates the state in which a web browser is displayed after assigning a function and a user input and terminating the mapping mode in FIG. 6B.

According to certain embodiments, the processor 430 may receive a user input (e.g., a second user input) using the stylus pen 650 through the wireless communication circuit 420 while an application is being displayed on the display, and may execute a function selected to correspond to the second user input.

In the case where a single-click input is mapped to a URL input window and where a double-click input is mapped to a back button, if the user performs a single-click input in the state in which the stylus pen is located at a distance from the electronic device 600, the electronic device may execute a function corresponding to the touch or hovering input with respect to the URL input window (e.g., moving to the web page corresponding to the URL in the URL input window or initiating keyboard or voice input for URL input), and if the user performs a double-click input, the electronic device may execute a function corresponding to touch or hovering input with respect to the back button (e.g., returning to the previous web page). Accordingly, the user may select a function to be executed in the displayed application using the stylus pen even if the stylus pen is not in proximity to the display of the electronic device 600.

According to certain embodiments, the processor 430 may display guidance information 691 and 692 for guiding a function mapped to a user input using the stylus pen 650. For example, in order to allow the user to recognize an object (e.g., an icon) mapped to a user input, the guidance information 691 and 692 may be displayed adjacent to or overlaid on the object, and may include a visual element that helps the user recognize the type of user input (e.g., a single-click input, a double-click input, or a long-click input).

According to certain embodiments, the guidance information 691 and 692 may not be displayed according to a user setting.

According to certain embodiments, if a mapped function is executed by a user input of the stylus pen 650, the processor 430 may display information indicating that the selected function is being executed. For example, the selected accessibility node may be displayed for a while, and may then fade out through an animation effect (not shown).

Mapping Operation of Stylus Pen Using a Shortcut Key

Figure 7A:
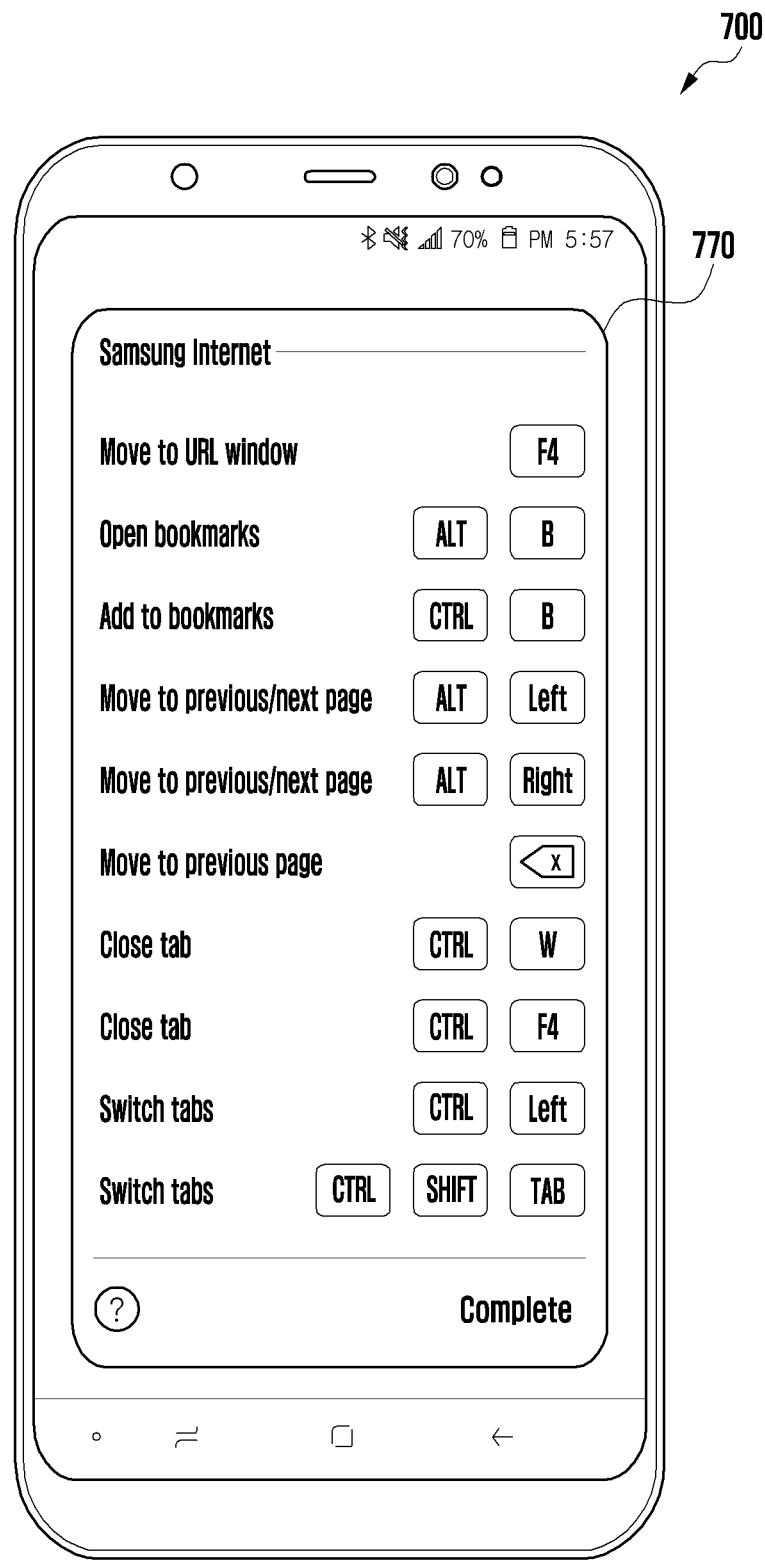
FIG. 7A illustrates an example of mapping a function of an electronic device to an operation of a stylus pen using a shortcut key according to certain embodiments.
Figure 7B:
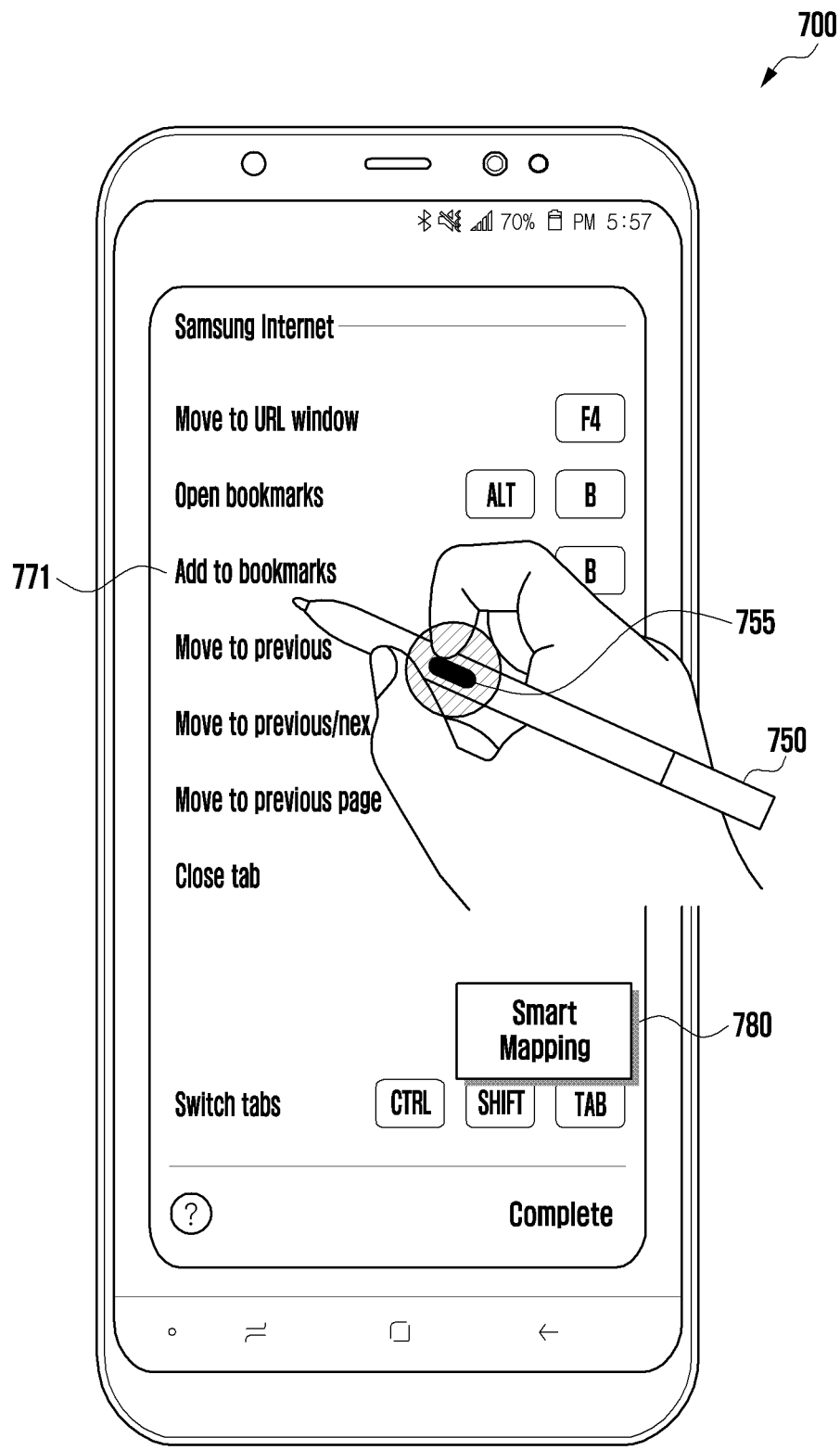
FIG. 7B illustrates an example of mapping a function of an electronic device to an operation of a stylus pen using a shortcut key according to certain embodiments.
Figure 7C:
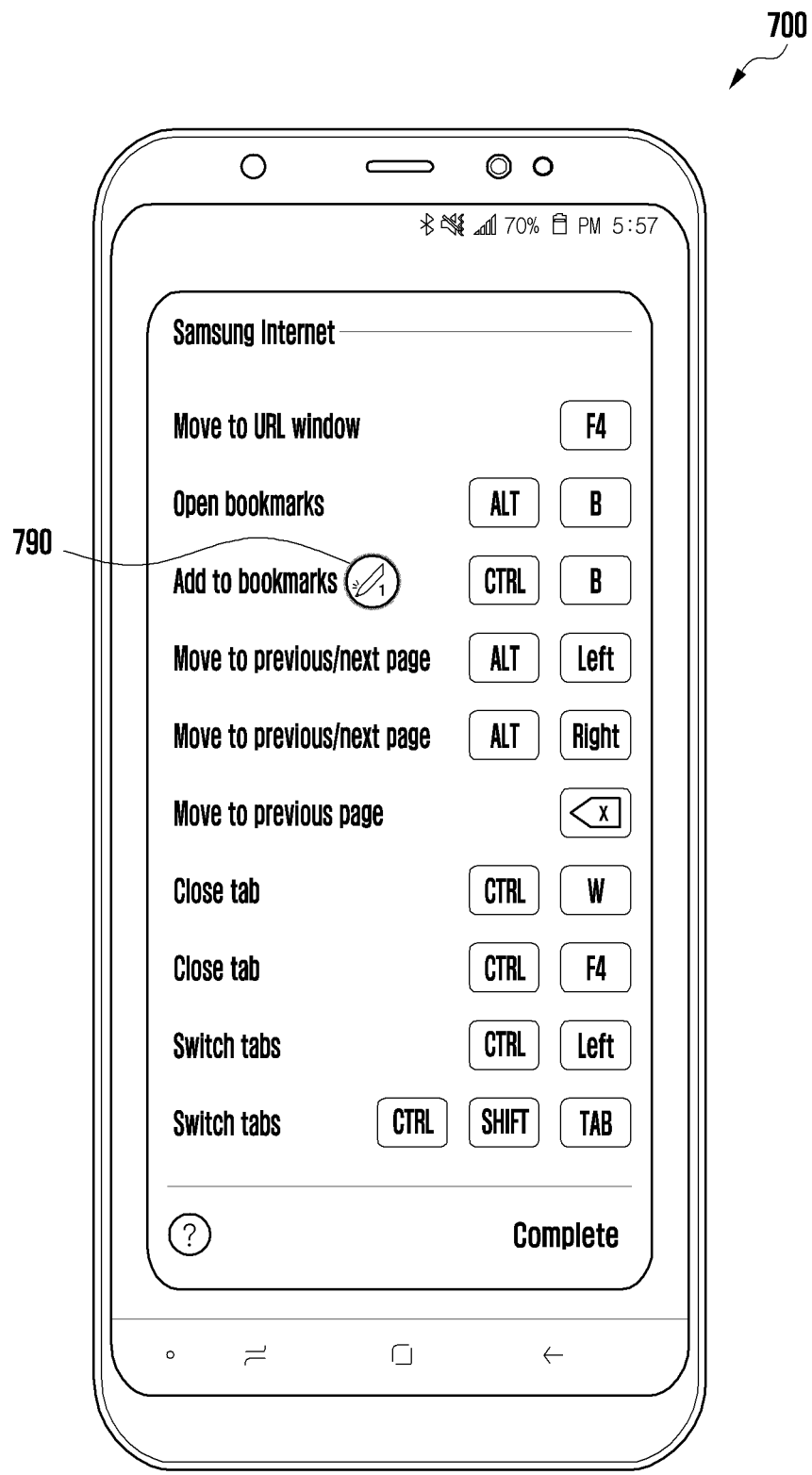
FIG. 7C illustrates an example of mapping a function of an electronic device to an operation of a stylus pen using a shortcut key according to certain embodiments.

FIG. 7A illustrates an example of mapping a function of an electronic device 700 to an operation of a stylus pen using a shortcut key according to certain embodiments, FIG. 7B illustrates an example of mapping a function of an electronic device 700 to an operation of a stylus pen using a shortcut key according to certain embodiments, and FIG. 7C illustrates an example of mapping a function of an electronic device 700 to an operation of a stylus pen using a shortcut key according to certain embodiments.

The user can touch/hover over a particular function assigned to a smart key. The user can then make perform a stylus pen function, such as single clicking over the particular function. Accordingly, the stylus pen function becomes mapped to the particular function.

According to certain embodiments, a processor (e.g., the processor 430 in FIG. 4) may identify one or more pieces of shortcut key information assigned to one or more functions of a user interface, may display one or more pieces of shortcut key information on a user interface, may receive a first user input using a stylus pen in order to select any one of the one or more pieces of shortcut key information while the stylus pen is in contact with or adjacent to a display, may map a function corresponding to the selected shortcut key information and the first user input through the stylus pen, and may store the same in a memory (e.g., the memory 440 in FIG. 4).

FIG. 7A illustrates the state in which shortcut key information 770 assigned to respective functions of a web browser application is displayed in a mapping mode. The processor 430 may identify the shortcut key mapping of a framework with respect to the screen of an activity or fragment that is running in the foreground. For example, the shortcut key information 770 in FIG. 7A may be displayed if a specific icon or a shortcut key in a keyboard is pressed in a web browser, and information on respective functions and shortcut keys of the keyboard may be displayed.

FIG. 7B illustrates the process in which a user maps a user input made through a stylus pen to a specific shortcut key.

The processor (e.g., the processor 430 in FIG. 4) may receive a user input (or a first user input) using the stylus pen 750 while the stylus pen 750 is touching or is hovering over any one of displayed shortcut keys. For example, in the case where a shortcut key "ctrl+B" is assigned to a bookmark function 771, the user may perform a single-click input on the button 755 of the stylus pen 750 while the stylus pen 750 is touching or is hovering over the bookmark function 771. The second wireless communication circuit of the stylus pen 750 may transmit a wireless signal corresponding to the single-click input to the wireless communication circuit 420. The processor 430 may identify the user input, based on the received wireless signal, and may map the bookmark function (a function of the user interface) to the single-click input (a user input of the stylus pen 750), thereby storing the same in the memory 440.

According to certain embodiments, the processor 430 may display, on the user interface, mode information 780 indicating that the electronic device is currently in the mapping mode, and the mode information 780 may be removed if the mapping mode ends (or if the electronic device switches to the normal mode).

FIG. 7C illustrates a screen after assigning a function and a user input and terminating the mapping mode in FIG. 7B. In the case where a bookmark function and a single-click input are mapped as described in FIG. 7B, the processor 430 may display guidance information 790 corresponding thereto.

Thereafter, if the user performs a single-click input using the stylus pen while a web browser application is running, the processor 430 may identify shortcut key information "ctrl+B" mapped thereto, and may execute a bookmark function corresponding to the shortcut key (e.g., bookmarking the current web page).

According to certain embodiments, in order for the user to recognize that the shortcut key function is executed, the processor 430 may provide an animation effect (not shown) in which an image representing the mapped shortcut key "ctrl+B" is displayed for a while and then fades out.

Figure 8A:
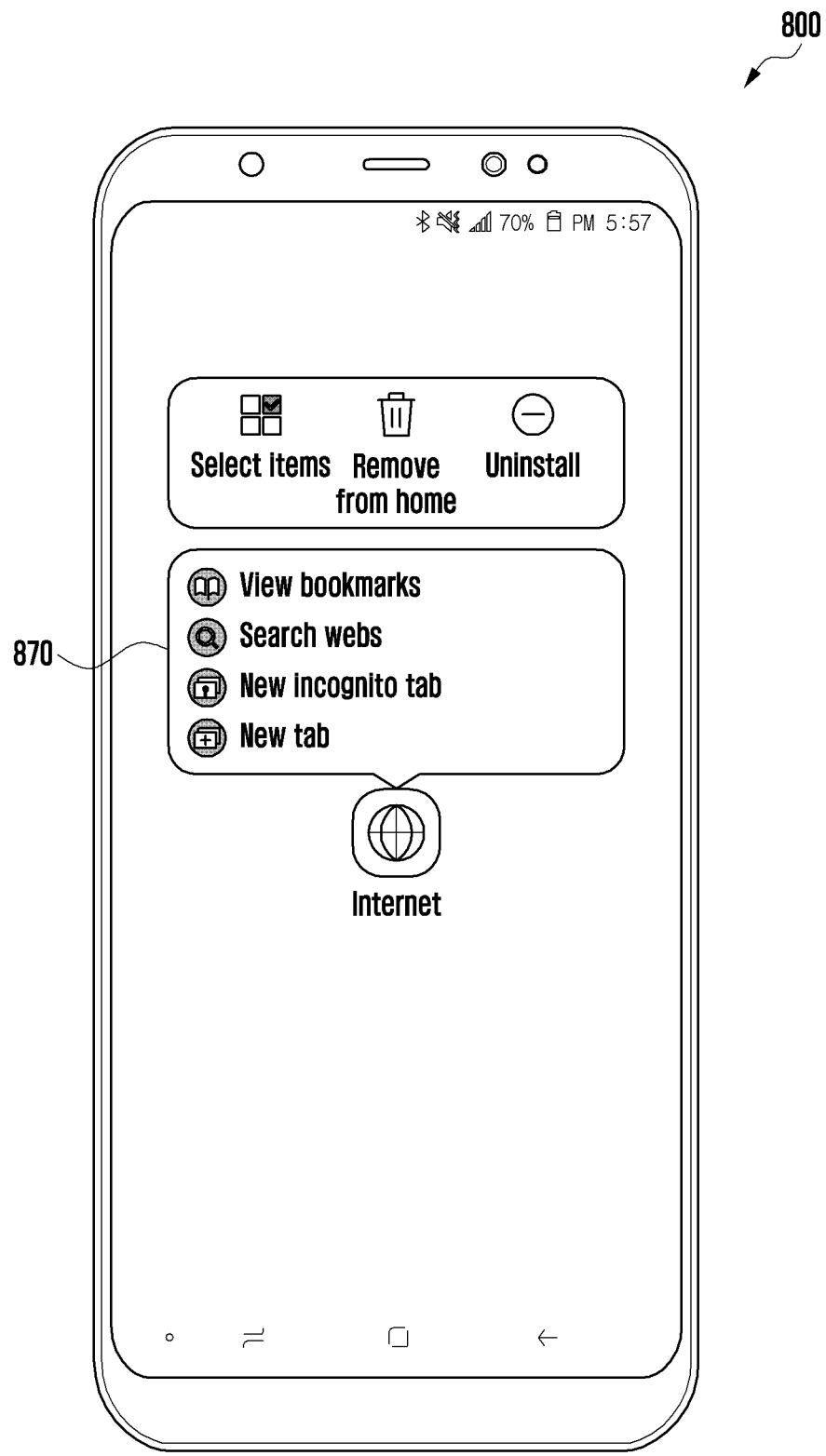
FIG. 8A illustrates an example of mapping a function of an electronic device to an operation of a stylus pen using an application shortcut or an application link according to certain embodiments.
Figure 8B:
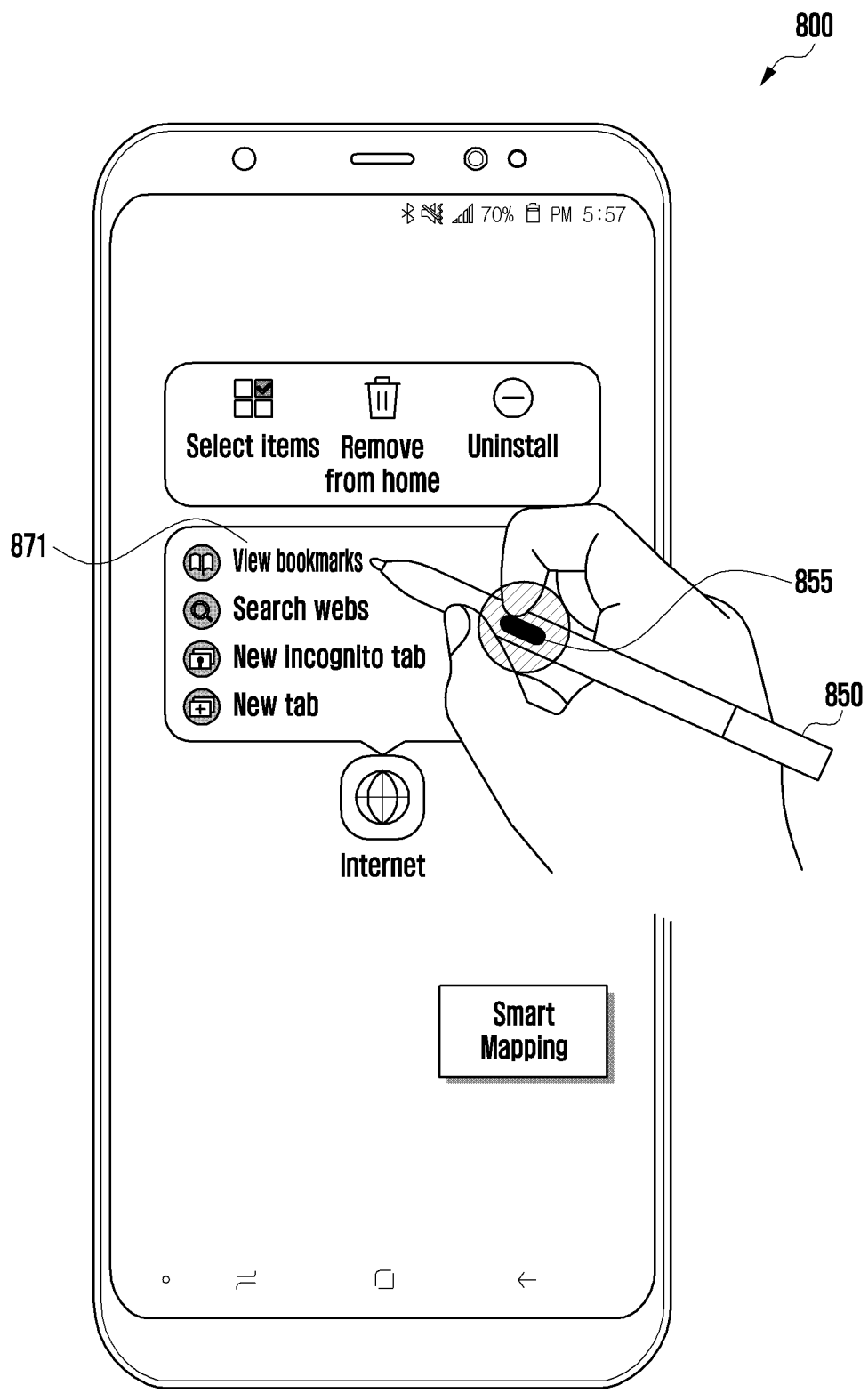
FIG. 8B illustrates an example of mapping a function of an electronic device to an operation of a stylus pen using an application shortcut or an application link according to certain embodiments.
Figure 8C:
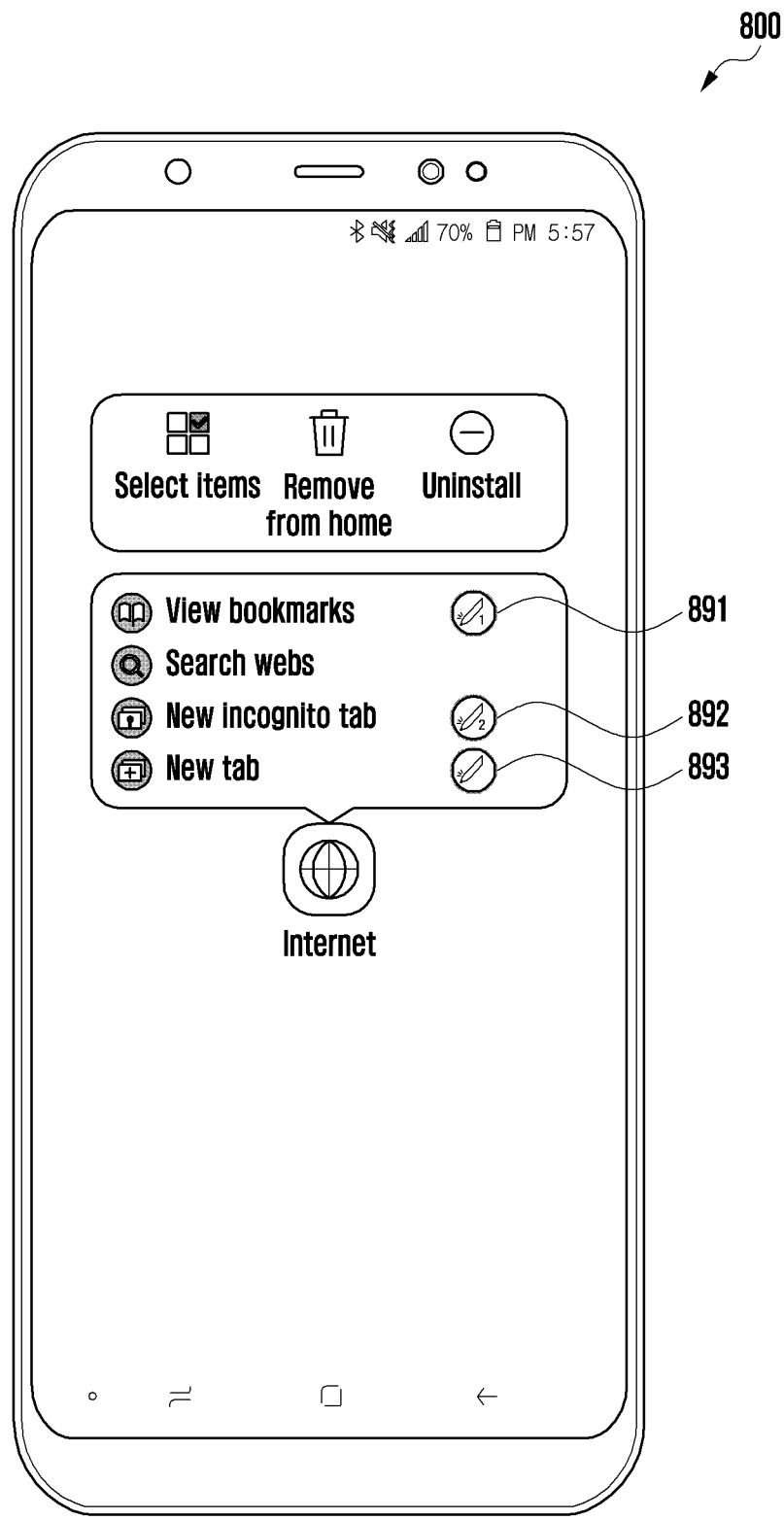
FIG. 8C illustrates an example of mapping a function of an electronic device to an operation of a stylus pen using an application shortcut or an application link according to certain embodiments.

FIG. 8A illustrates an example of mapping a function of an electronic device 800 to an operation of a stylus pen using an application shortcut or an application link according to certain embodiments; FIG. 8B illustrates an example of mapping a function of an electronic device 800 to an operation of a stylus pen using an application shortcut or an application link according to certain embodiments, and FIG. 8C illustrates an example of mapping a function of an electronic device 800 to an operation of a stylus pen using an application shortcut or an application link according to certain embodiments.

An application shortcut function may be intended to specify a function to be executed immediately in a corresponding application if a specific type of input (e.g., a long touch) is input to the application icon in the home launcher. For example, frequently used functions for the web browser application, such as bookmark view, web search, new incognito tab, new tab, and the like, may be pre-registered as application shortcuts. Functions to be registered as application shortcuts may be configured in advance by the manufacturer of the electronic device or an application developer. In this case, since the application developer writes the specifications of the application shortcut function in the "AndroidManifest.xml file", it is possible to identify an application shortcut function of the corresponding application in the framework. According to another embodiment, the user may map and register application shortcuts through a separate user interface.

The application link function may be intended to provide, through a link, a function to be executed immediately if an application is executed. For example, a function frequently used, among the functions that the user enters through various steps using a user interface, may be configured to be more easily accessed through the application link function. Functions to be registered as the application links may be pre-configured by the manufacturer of the electronic device or an application developer, or may be registered by the user through a separate user interface.

FIG. 8A illustrates the state in which assigned shortcut information 870 in a web browser application is displayed in a mapping mode. For example, bookmark view, web search, new incognito tab, and new tab are registered as shortcuts for a web browser application, and if a user executes the web browser application in a specific manner (e.g., a long touch) on a home screen, the application shortcut information 870 may be displayed.

FIG. 8B illustrates a process in which a user maps a user input of the stylus pen 850 to a specific shortcut.

A processor (e.g., the processor 430 in FIG. 4) may receive a user input (or first user input) using the stylus pen 850 while the stylus pen 850 is touching or is hovering over any one of displayed shortcuts. For example, a user may perform a single-click input on a button 855 of the stylus pen 850 while the stylus pen 850 is touching or is hovering over a bookmark view function 871. A second wireless communication circuit of the stylus pen 850 may transmit a wireless signal corresponding to a single-click input to a wireless communication circuit (e.g., the wireless communication circuit 420 in FIG. 4). The processor 430 may identify the user input, based on the received wireless signal, and may map the bookmark view function (a function of the user interface) to the single-click input (a user input of the stylus pen 850), thereby storing the same in a memory (e.g., the memory 440 in FIG. 4).

FIG. 8C illustrates a screen after assigning a function and a user input and terminating the mapping mode in FIG. 8B. Referring to FIG. 8C, a single-click input may be mapped to the bookmark view; a double-click input may be mapped to the new incognito tab; and a long-click input may be mapped to the new tab through the process as described with reference to FIG. 8B. The processor 430 may display guidance information 891, 892, and 893 corresponding thereto so as to be adjacent to the respective application shortcuts.

Thereafter, if the user performs a single-click input using the stylus pen 850 while the application shortcut is being displayed, the processor 430 may execute the bookmark view function, which is a function mapped thereto.

Figure 9A:
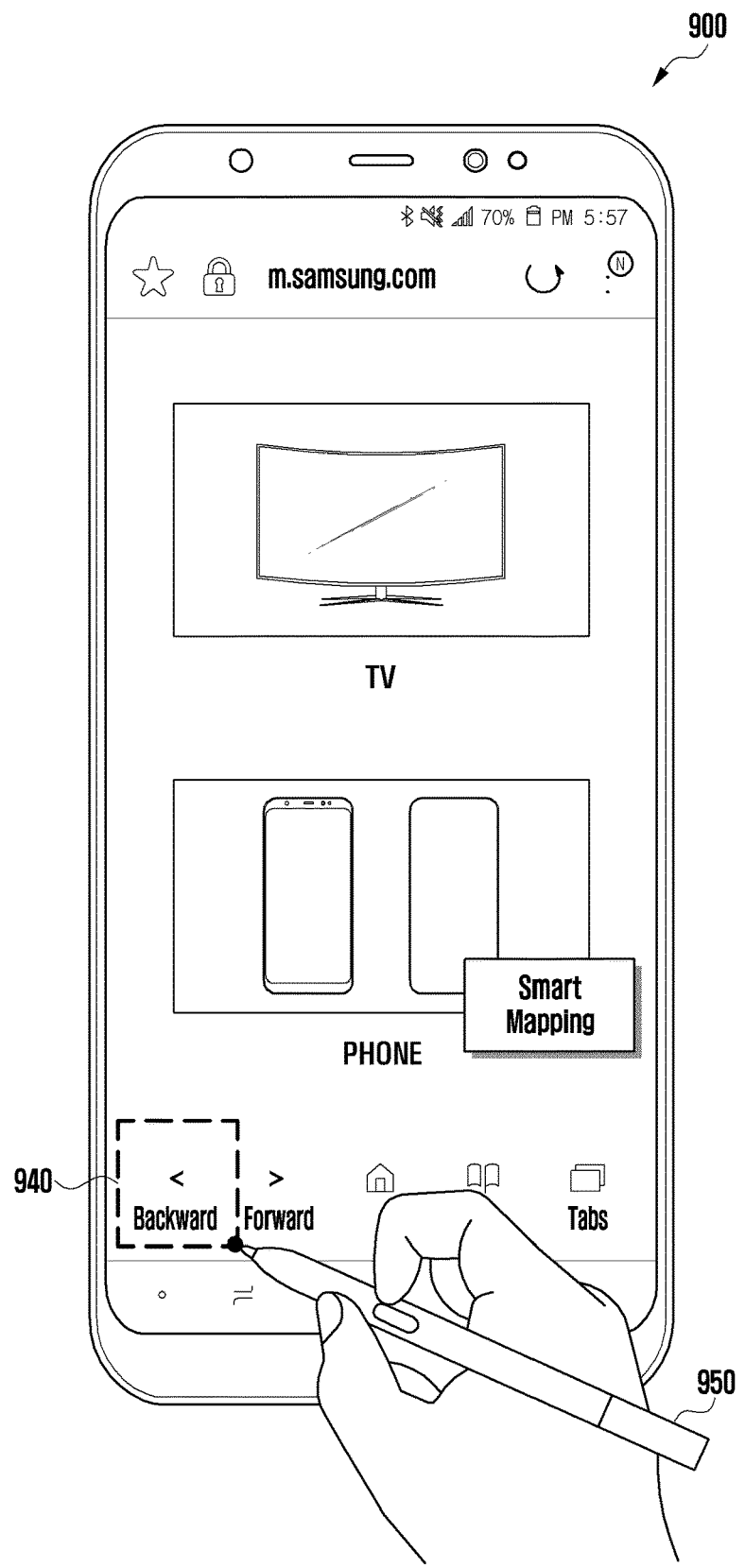
FIG. 9A illustrates an example of mapping a function in the area specified by a user to an operation of a stylus pen according to certain embodiments.
Figure 9B:
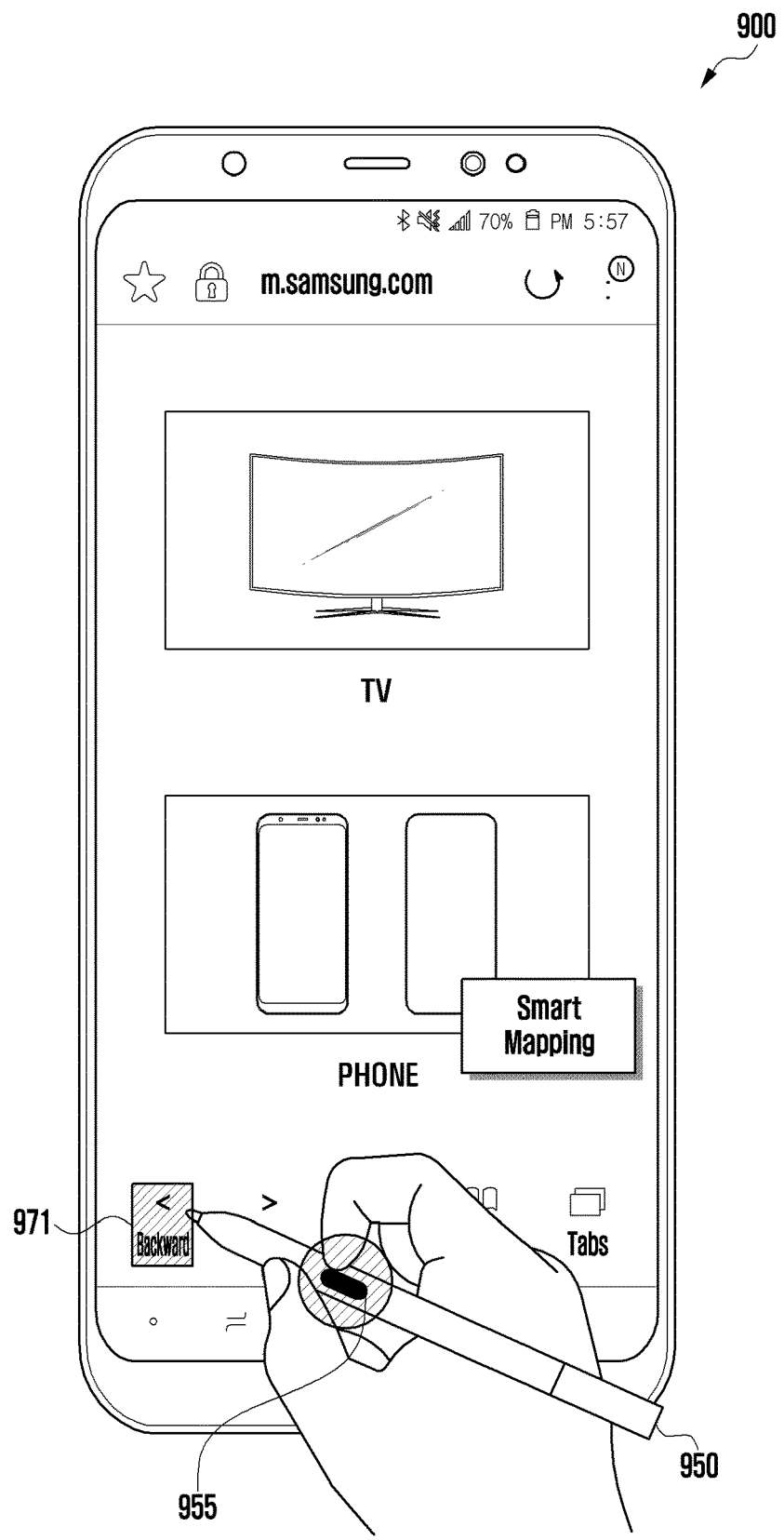
FIG. 9B illustrates an embodiment of mapping a function in the area specified by a user to an operation of a stylus pen according to certain embodiments.
Figure 9C:
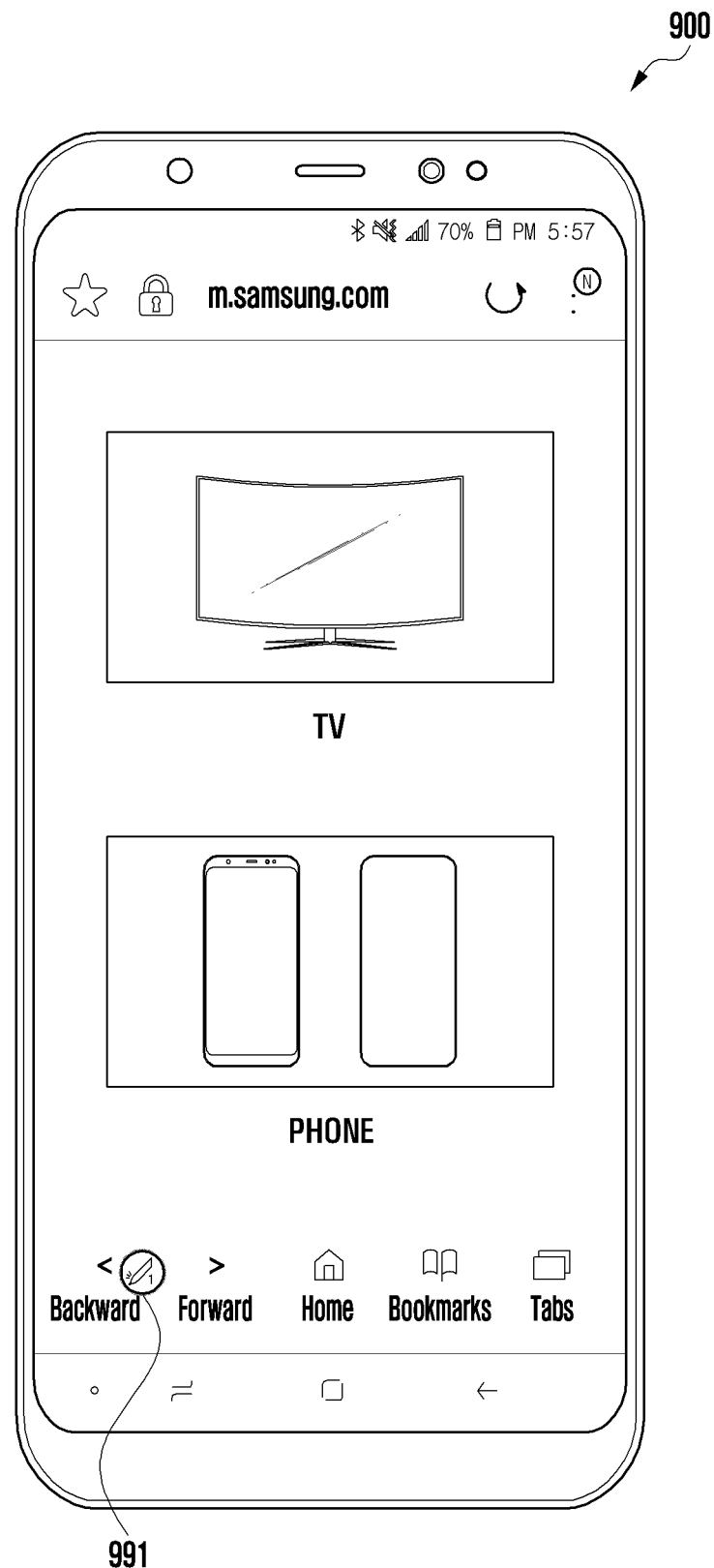
FIG. 9C illustrates an embodiment of mapping a function in the area specified by a user to an operation of a stylus pen according to certain embodiments.

FIG. 9A illustrates an example of mapping a function in the area specified by a user to an operation of a stylus pen according to certain embodiments, FIG. 9B illustrates an example of mapping a function in the area specified by a user to an operation of a stylus pen according to certain embodiments, and FIG. 9C illustrates an example of mapping a function in the area specified by a user to an operation of a stylus pen according to certain embodiments.

According to certain embodiments, a processor (e.g., the processor 430 in FIG. 4) may identify point or area coordinates 940 on the user interface by the contact or proximity of the stylus pen 950, may receive a first user input using the stylus pen 950, and may map a function corresponding to the identified point or area coordinates to the first user input through the stylus pen, thereby storing the same in a memory (e.g., the memory 440 in FIG. 4).

FIG. 9A illustrates the state in which a web browser application is displayed in a mapping mode.

The user may select a function to be mapped to a user input of the stylus pen 950 by specifying an area through a touch (or hovering) or drag input to a specific point while the web browser application is being displayed as shown in FIG. 9A. As shown in FIG. 9A, if a user specifies an area on the bottom left corner of the screen by a drag input, the corresponding area may include a back button 971, which is an accessibility node.

Referring to FIG. 9B, the processor 430 may identify an accessibility node 971 capable of executing a function to be mapped to a user input in the area specified by the user, and may display the accessibility node 971 by distinguishing and/or highlighting the same. According to certain embodiments, the processor 430 may use relative coordinates of the area specified by the user. The relative coordinates may be relatively calculated by the difference in a change in the resolution, and, for example, in the case of a change in orientation (e.g., a landscape or portrait mode) of the electronic device, a multi-window mode, or a change in the resolution, relative coordinate values may be used through proportional changes on the assumption that an X-axis and a Y-axis correspond to 100%.

According to certain embodiments, if there is a plurality of selectable nodes within the area specified by the user, it is possible to specify the node that occupies the widest area or the node that is most important or frequently used through application information analysis.

Referring to FIG. 9B, a user may specify an area 940 including the back button 971 by dragging, and may then perform a single-click input on the button 955 of the stylus pen 950 while maintaining touch or hovering. In this case, the single-click input and the back button function 971 may be mapped and stored in the memory 440.

Although it is illustrated in FIGS. 9A and 9B that the accessibility node 971 in the area specified by the user is mapped to the input on the button of the stylus pen 950, the embodiment is not limited thereto. According to certain embodiments, even if the area specified by dragging by the user does not include the accessibility node 971, a touch input on the corresponding area and an input on the button of the stylus pen 950 may be mapped. For example, in the case of mapping and storing inputs, such as a single-click input, a double-click input, and a long-click input, with respect to a plurality of areas on the execution screen of an application (e.g., a game application), the user may perform a touch input with respect to the plurality of areas merely by manipulating a button of the stylus pen 950 when executing the corresponding application.

FIG. 9C illustrates a screen after assigning a function and a user input and terminating the mapping mode in FIG. 9B. Referring to FIG. 9C, a back button 971 may be mapped to a single-click input of the stylus pen 950 through the process described with reference to FIG. 9B. The processor 430 may display the guidance information 991 corresponding thereto so as to be adjacent to respective application shortcuts.

Thereafter, if the user performs a single-click input on the stylus pen 950 while the web browser application is running, a function corresponding to the back button 971 may be executed.

Although embodiments in which a user selects a function of mapping a user input of a stylus pen have been illustrated in FIGS. 6A to 9C, certain embodiments of the disclosure are not limited thereto.

For example, the user may map a function of an unlimited application, which can be executed by a touch, hovering, or voice input, to a user input through a stylus pen.

According to certain embodiments, it is possible to map a function of determining an application to be executed to a user input of a stylus pen (e.g., the stylus pen 650 in FIG. 6D) without being limited to the execution of a specific application. For example, if a user input of a stylus pen (e.g., pressing a button) is received at the same time, at least in part, as a touch or hovering input on a specific application while a user interface of the home screen is displayed in a mapping mode, execution of the corresponding application and the received user input may be mapped and stored.

According to certain embodiments, the user input using the stylus pen is not limited to any specific type. Although a single-click input, a double-click input, and a long-click input on a button (e.g., the button 655 in FIG. 6D) provided in the stylus pen have been described as examples of a user input in the above embodiments, a motion input, a voice input, and an image input using other sensors (e.g., the sensor 570 in FIG. 5) other than the button may be used as a user input. For example, if the user tilts the stylus pen to the left and presses a button thereof while the stylus pen is touching (or is hovering over) a specific function area, "tilting left and pressing a button" may be mapped to the corresponding function. Also, if a user inputs a predetermined voice to the stylus pen while the stylus pen is touching a specific function area, the input voice may be mapped to the corresponding function.

According to certain embodiments, the processor 430 may map a macro input, which records consecutive user inputs, to a function of the electronic device. For example, a succession of multiple button inputs, motion inputs, and voice inputs may be defined as a single user input. The processor 430 may provide a UI for recording a start and an end of consecutive user inputs, and may store a plurality of user inputs sequentially received, thereby mapping the user inputs as a single user input to a function.

Figure 10A:
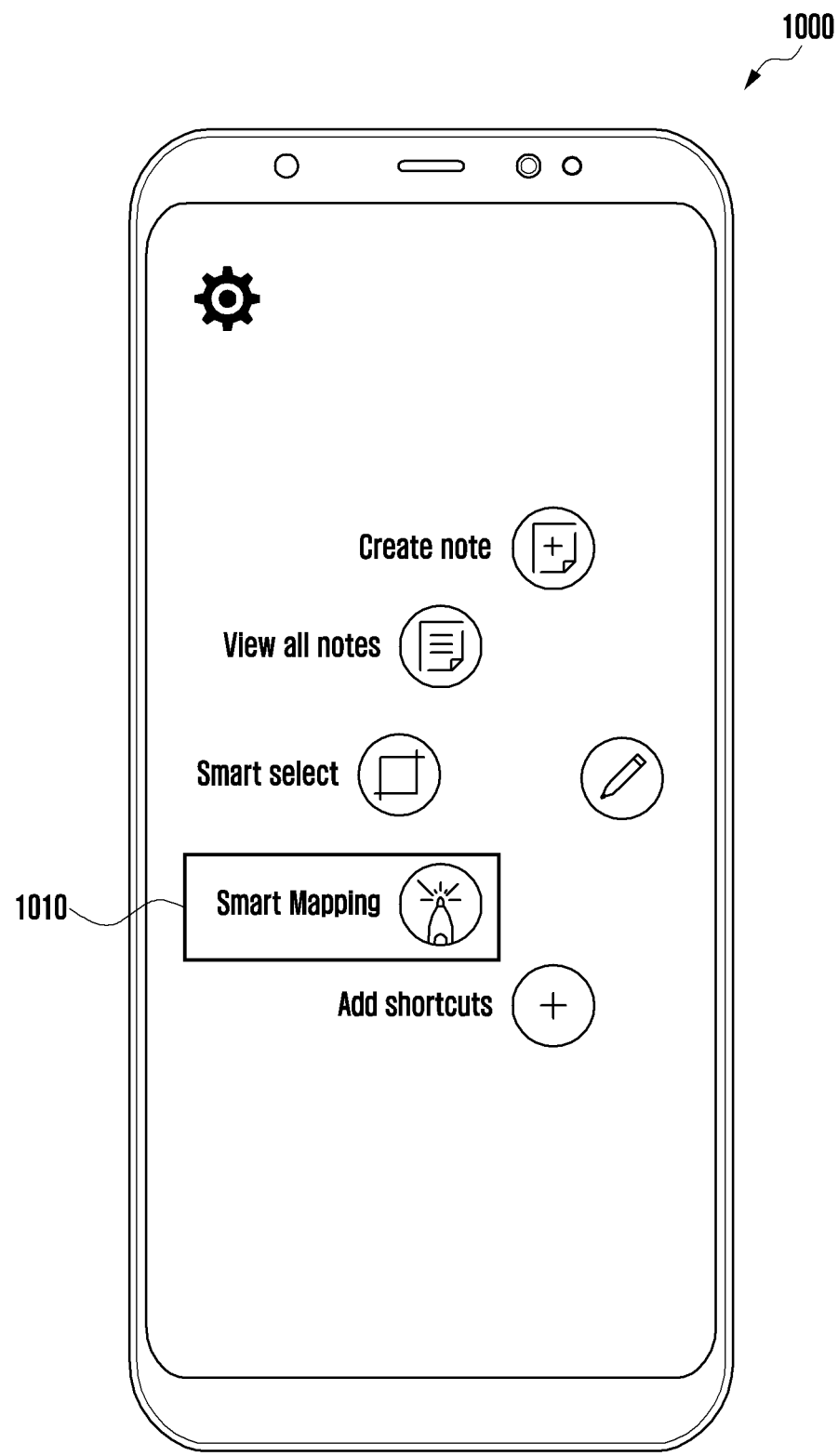
FIG. 10A illustrates an example of a user interface in a process of entering a mapping mode according to certain embodiments.
Figure 10B:
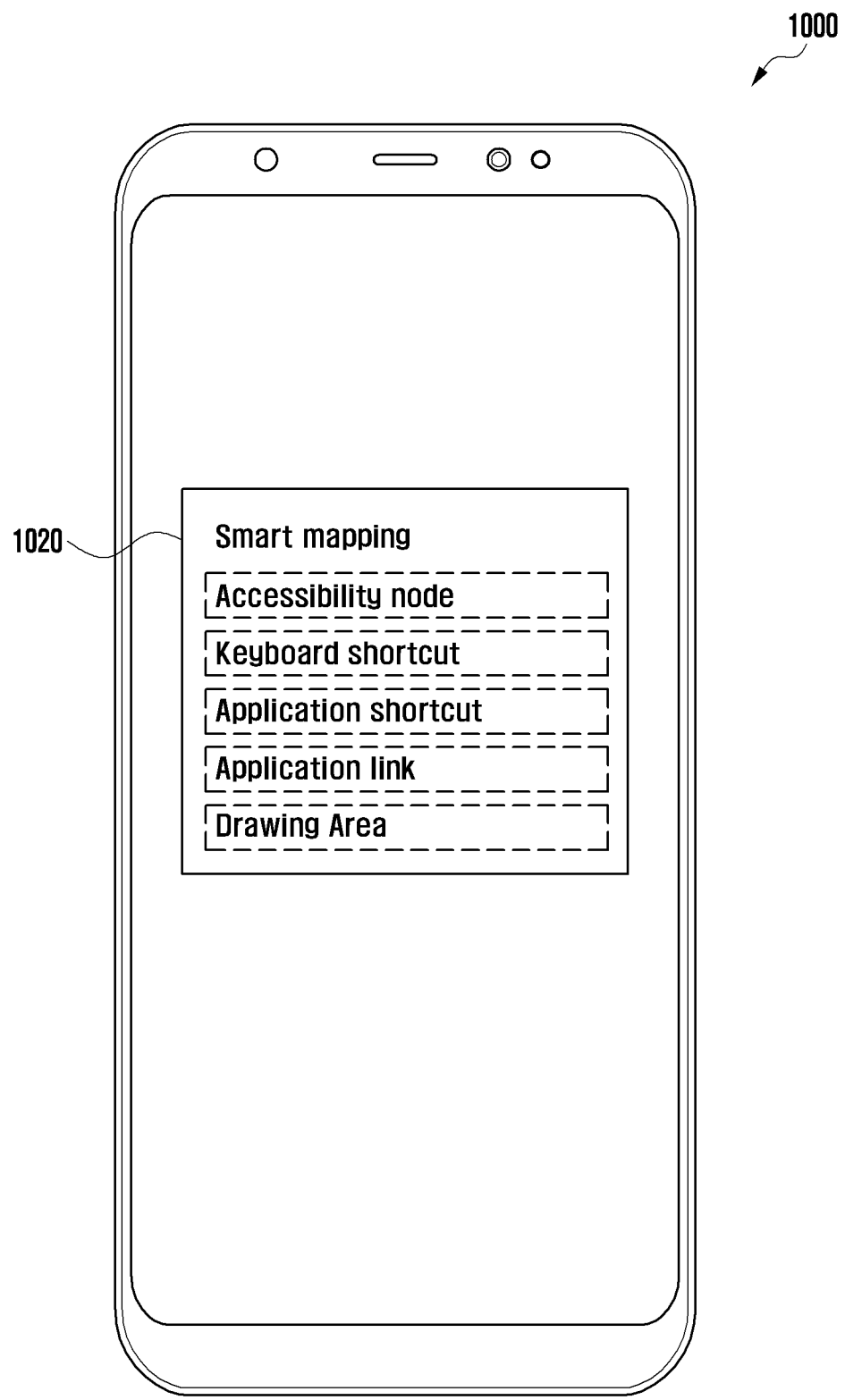
FIG. 10B illustrate an example of a user interface in a process of entering a mapping mode according to certain embodiments.

FIG. 10A illustrates an example of a user interface in a process of entering a mapping mode according to certain embodiments, and FIG. 10B illustrates an example of a user interface in a process of entering a mapping mode according to certain embodiments.

The user interface shown in FIGS. 10A and 10B may be provided before entering a mapping mode screen (e.g., FIGS. 6 to 9).

According to certain embodiments, a processor (e.g., the processor 430 in FIG. 4) may provide a setting menu 1010 for selecting a switch to a mapping mode according to an event occurring while the application is running.

According to certain embodiments, if a user input is received from a stylus pen while a user interface of an application is being displayed, the processor 430 may identify whether or not there is a function mapped to the user input. If there is a function mapped to the user input, the processor 430 may directly execute the mapped function. If there is no function mapped to the user input, the processor 430 may display a setting menu screen 1010 as shown in FIG. 10A, so that the electronic device may switch to a mapping mode in response to a user's selection.

According to other embodiments, the electronic device may provide a separate setting menu for entering a mapping mode. The setting menu 1010 may include the configuration shown in FIG. 10A.

According to another embodiment, the electronic device may switch to a mapping mode if a predetermined user input (e.g., a single-click input or a long-click input) with respect to the stylus pen is received in the state in which the stylus pen is at a distance from the electronic device.

FIG. 10B illustrates a user interface for selecting a mapping method when entering a mapping mode.

According to certain embodiments, the processor 430 may provide various user interfaces for selecting a function to be mapped to a user input using a stylus pen in a mapping mode, and may provide a user interface for selecting any one of available mapping methods.

As described above, the processor 430 may provide at least one piece of accessibility node information, shortcut key information, application shortcut information, or application link information, which may be supported by an application, through a user interface 1020.

According to certain embodiments, if the user selects switching to the mapping mode in FIG. 10A, the processor 430 may provide a user interface 1020 for selecting any one of the mapping methods such as the supportable accessibility node information, shortcut key information, application shortcut information, application link information, or the like, as shown in FIG. 10B.

According to certain embodiments, the processor 430 may determine a mapping method suitable for an application running in the foreground, may provide some of the plurality of mapping methods through a user interface, or may determine the order of selection menus of the user interface according to an appropriate mapping method. For example, in the case of a web browser application, since it is most intuitive and easy to select functions through the accessibility nodes, the processor 430 may preferentially provide a selection menu for the accessibility nodes, or may dispose the same on top. In addition, in the case of a game application, since other methods are not easy due to the degree of freedom of activity, the processor 430 may preferentially provide a selection menu to allow a user to directly access the area, or may dispose the same on top.

According to certain embodiments, an electronic device 400 comprises a display 410 configured to display a user interface including one or more objects 671-679 corresponding to one or more functions ("backwards", "forwards", place cursor in box), at least one wireless communication circuit 420 configured to wirelessly connect to a stylus pen, at least one processor 430 operatively connected to the display and the wireless communication circuit 420, and a memory 440 operatively connected to the at least one processor, wherein the memory is configured to store the user interface, and wherein the memory stores instructions that, when executed, cause the at least one processor to provide the user interface 610 to the display 410, detect contact or proximity of the stylus pen with a selected object of the one or more objects 671-679 of the user interface 610 on the display 410, wherein the selected object, e.g., object 673 or 674, corresponds to a selected function of the one or more functions, receive a first user input using the stylus pen 350 through the wireless communication circuit 420, the first user input having a selected stylus pen input type from one or more stylus pen input types, while the stylus pen is in contact or proximate to the selected object, and in response to the first user input, map the selected function to the selected stylus pen input type.

According to certain embodiments, the instructions may cause the at least one processor to receive a second user input using the stylus pen through the wireless communication circuit while the user interface is being displayed on the display, the second user input having the selected stylus pen input type, and execute the selected function in response to the second user input, regardless of a location of the stylus pen.

According to certain embodiments, the instructions may cause the at least one processor to display guidance information 691, 692 proximate to the selected object on the display, the display guidance information indicating the selected stylus pen input type.

According to certain embodiments, the electronic device may include a stylus pen 350 comprising a button, wherein the stylus pen is configured to transmit one or more wireless signals corresponding to the one or more stylus pen input types.

According to certain embodiments, the one or more stylus pen input types include a single-click input, a double-click input, and a long-click input on the button.

According to certain embodiments, the instructions may cause the at least one processor to determine the selected function, based at least in part on at least one piece of accessibility node information, shortcut key information, application shortcut information, or application link information.

According to certain embodiments, the one or more objects comprise one or more accessibility nodes, and the selected object comprises a selected accessibility node of the one or more accessibility nodes, and wherein the instructions cause the at least one processor to identify the one or more accessibility nodes, and distinguish the one or more accessibility nodes on the display from the rest of the interface.

According to certain embodiments, the one or more objects comprise one or more shortcut key information objects, and the selected object comprises a selected shortcut key information objects of the one or more shortcut key information objects.

According to certain embodiments, the instructions may cause the processor to when a second user input is received from the stylus pen having a particular stylus pen input type from the one or more stylus pen input types while displaying the user interface, identify whether or not a function is mapped to the particular stylus pen input type; and when there is no mapped function, switch to a mapping mode to display the user interface.

According to certain embodiments, the wireless communication circuit is configured to wirelessly connect to the stylus pen using Bluetooth low energy (BLE).

According to certain embodiments, an electronic device comprises a display configured to display a user interface, at least one wireless communication circuit configured to wirelessly connect to a stylus pen, at least one processor operatively connected to the display and the wireless communication circuit, and a memory operatively connected to the at least one processor, wherein the memory is configured to store the user interface, and wherein the memory stores instructions that, when executed, cause the at least one processor to: provide the user interface to the display; detect contact or proximity of the stylus pen with a point or area coordinates; receive a first user input using the stylus pen through the wireless communication circuit, the first user input having a selected stylus pen input type from one or more stylus pen input types, while the stylus pen is in contact or proximate with the point or area coordinates; and in response to the first user input, map a function corresponding to the identified point or area coordinates to the selected stylus pen input type.

Figure 11:
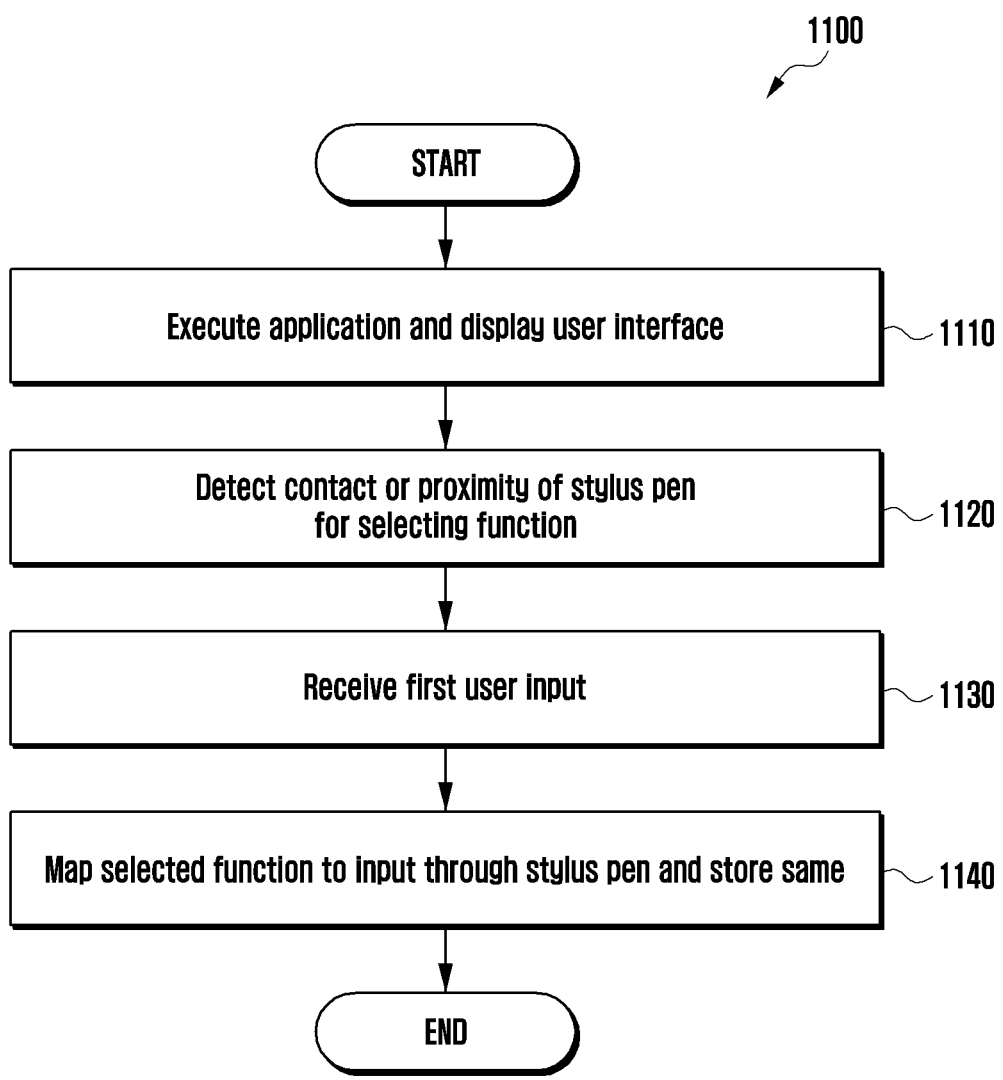
FIG. 11 is a flowchart illustrating a method of mapping a function of an electronic device to an operation of a stylus pen according to certain embodiments.

FIG. 11 is a flowchart 1100 of a method of mapping a function of an electronic device to an operation of a stylus pen according to certain embodiments.

The illustrated method may be performed by the electronic device described with reference to FIGS. 1 to 10, and the description thereof has been made in the previous embodiments, which will be omitted below.

In operation 1110, an electronic device (e.g., the processor 430 in FIG. 4) may execute an application, thereby displaying a user interface for selecting at least one function. The application may be any of various applications that may be executed by an electronic device, such as a web browser, a game application, and a memo application.

In operation 1120, the electronic device may detect that a stylus pen comes into contact with or approaches the electronic device in order to select one of the functions of the electronic device while the user interface is being displayed. Here, the functions may include at least one piece of accessibility node information, shortcut key information, application shortcut information, or application link information, which can be supported by the application.

In operation 1130, the electronic device may receive a first user input using the stylus pen from the stylus pen upon detecting the contact or proximity of the stylus pen. The first user input may include any of various inputs such as a single-click input, a double-click input, or a long-click input on the button of the stylus pen.

In operation 1140, the electronic device may map the selected function to the input using the stylus pen, thereby storing the same. A method of mapping a function and a user input and storing the same has been described in detail with reference to FIGS. 6 to 9.

Figure 12:
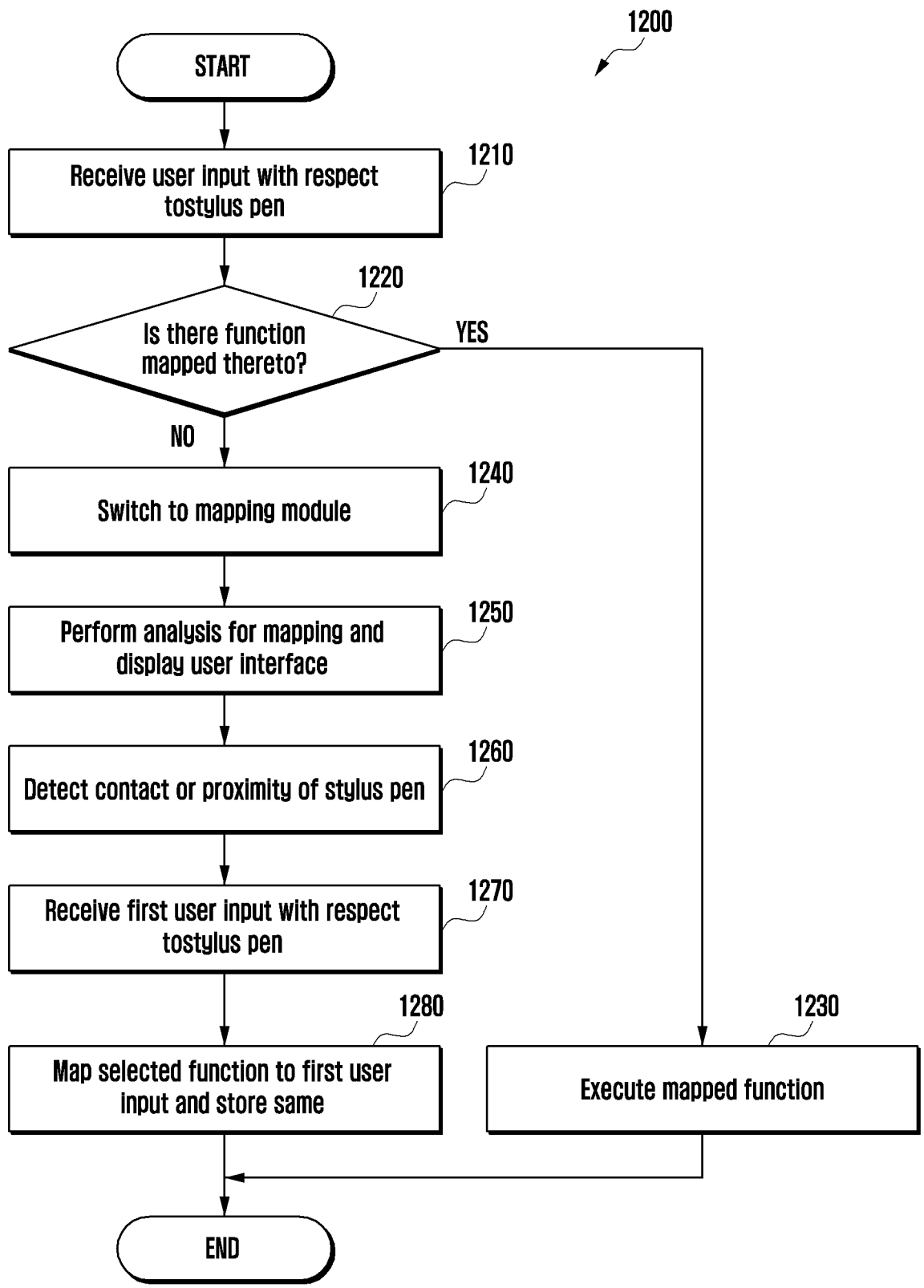
FIG. 12 is a flowchart illustrating a method of mapping a function of an electronic device and an operation of a stylus pen according to certain embodiments.

FIG. 12 is a flowchart 1200 of a method of mapping a function of an electronic device to an operation of a stylus pen according to certain embodiments.

The illustrated method may be performed by the electronic device described with reference to FIGS. 1 to 10, and the description thereof has been made in the previous embodiments, which will be omitted below.

In operation 1210, an electronic device (e.g., the processor 430 in FIG. 4) may receive a user input of a stylus pen (e.g., the stylus pen 450 in FIG. 4) through a wireless communication circuit (e.g., the wireless communication circuit 420 in FIG. 4). According to certain embodiments, the user input of the stylus pen may include an input (e.g., a single-click input, a double-click input, or a long-click input) to a button (e.g., the button 460 in FIG. 4).

In operation 1220, the electronic device may identify whether or not there is a function mapped to the received user input. If there is a mapped function, the electronic device may execute the identified function in operation 1230.

In operation 1240, if there is no function mapped to the user input, the electronic device may switch to a mapping mode. According to certain embodiments, the electronic device may provide a user interface (see FIG. 10A) for determining entry into a mapping mode and a user interface (see FIG. 10B) for determining a mapping method.

According to another embodiment, the electronic device may provide a separate setting menu for entering a mapping mode. According to another embodiment, if a predetermined user input (e.g., a single-click input or a long-click input) with respect to the stylus pen is received in the state in which the stylus pen is at a distance from the electronic device, the electronic device may switch to a mapping mode.

In operation 1250, the electronic device may display an analysis and a user interface for mapping. According to certain embodiments, the electronic device may provide, through a user interface, at least one piece of accessibility node information, shortcut key information, application shortcut information, or application link information, which can be supported by the application, according to a mapping method input by the user or a mapping method determined by the processor 430.

In operation 1260, the electronic device may detect that the stylus pen comes into contact with (touches) or approaches (hovers over) the display. In this case, the electronic device may detect the contact or proximity of the stylus pen to select any one of functions (e.g., an accessibility node) displayed on the user interface.

In operation 1270, the electronic device may receive a first user input to the stylus pen. The first user input may include an input on the button of the stylus pen.

In operation 1280, the electronic device may map the selected function to the first user input, thereby storing the same. A method of mapping a function and a user input and storing the same has been described in detail with reference to FIGS. 6 to 9.

In certain embodiments, a method of mapping a function of an electronic device to an operation of a stylus pen, the method comprises displaying a user interface for selecting one or more functions, detecting contact or proximity of the stylus pen to a location within the user interface for selecting a function of one or more functions while the user interface is being displayed, receiving a first user input using the stylus pen from the stylus pen while detecting contact or proximity of the stylus pen to the location within the user interface, the first user input having a selected stylus pen input type of one or more stylus pen input types, and in response to the first user input, mapping the selected function to the selected stylus pen user input type.

In certain embodiments, the method comprises receiving a second user input through the stylus pen from the stylus pen while the stylus pen is in contact or proximate with another location within the user interface for selecting another function of the one or more functions, the second user input having the selected stylus pen input type; and in response to the second user input, executing the selected function, regardless of the location of the.

In certain embodiments, the method comprises displaying guidance information indicating the selected stylus pen user input type proximate to the location within the user interface.

In certain embodiments, the first user input using the stylus pen is generated by at least one input on a button included in the stylus pen.

In certain embodiments, the method comprises providing at least one piece of accessibility node information, shortcut key information, application shortcut information, or application link information, which is supported by the user interface, in order to select one of the one or more functions.

In certain embodiments, the method comprises identifying one or more accessibility nodes displayed in the foreground of the application, and distinguishing the one or more accessibility nodes from the rest of the user interface on the display, wherein receiving the first user input comprises receiving the first user input when the stylus pen is in contact with or in proximity to a selected accessibility node of the one or more accessibility nodes, and wherein mapping the function comprises mapping a function corresponding to the selected accessibility node to the selected stylus pen input type.

In certain embodiments, the method comprises displaying shortcut key information on the user interface, wherein receiving the first user input comprises receiving the first user in contact with or in proximity to a portion of the shortcut key information, and wherein mapping the function comprises mapping a function corresponding portion of the shortcut key information to the selected stylus pen input type.

In certain embodiments, when a second user input having a particular stylus pen input type is received from the stylus pen while the user interface is displayed, identifying whether or not there is a function mapped to the selected stylus pen input type; and when there is no mapped function, switching to a mapping mode to display the user interface.

In certain embodiments, the method comprises receiving a second user input using the stylus pen through the wireless communication circuit, the second user input having another selected stylus pen input type from one or more stylus pen input types, while the stylus pen is in contact or proximate with another point or area coordinates; in response to the second user input, mapping another function corresponding to the another point or area coordinates to the another selected stylus pen input type; and in response to receiving a third user input having the selected stylus pen input type, performing the selected function regardless of location of the stylus pen; and in response to the third user input having the another selected stylus pen input type, performing the another selected function regardless of location of the stylus pen.

The above-described embodiments of the present disclosure can be implemented in hardware, firmware or via the execution of software or computer code that can be stored in a recording medium such as a CD ROM, a Digital Versatile Disc (DVD), a magnetic tape, a RAM, a floppy disk, a hard disk, or a magneto-optical disk or computer code downloaded over a network originally stored on a remote recording medium or a non-transitory machine readable medium and to be stored on a local recording medium, so that the methods described herein can be rendered via such software that is stored on the recording medium using a general purpose computer, or a special processor or in programmable or dedicated hardware, such as an ASIC or FPGA. As would be understood in the art, the computer, the processor, microprocessor controller or the programmable hardware include memory components, e.g., RAM, ROM, Flash, etc. that may store or receive software or computer code that when accessed and executed by the computer, processor or hardware implement the processing methods described herein. In addition, it would be recognized that when a general purpose computer accesses code for implementing the processing shown herein, the execution of the code transforms the general purpose computer into a special purpose computer for executing the processing shown herein. Any of the functions and steps provided in the Figures may be implemented in hardware, software or a combination of both and may be performed in whole or in part within the programmed instructions of a computer. No claim element herein is to be construed under the provisions of 35 U.S.C. 112, sixth paragraph, unless the element is expressly recited using the phrase "means for".

Although exemplary embodiments of the present disclosure have been described in detail hereinabove, it should be clearly understood that many variations and modifications of the basic inventive concepts herein described, which may appear to those skilled in the art, will still fall within the spirit and scope of the exemplary embodiments of the present disclosure as defined in the appended claims.

What is claimed is:

1. An electronic device comprising:
 a display;
 at least one wireless communication circuit configured to wirelessly connect to a stylus pen;
 at least one processor operatively connected to the display and the wireless communication circuit; and
 a memory operatively connected to the at least one processor,
 wherein the memory is configured to store a user interface, and
 wherein the memory stores instructions that, when executed, cause the at least one processor to:
  provide the user interface including one or more objects corresponding to one or more functions to the display;
  initiate a mapping mode for mapping a function corresponding to an object with a user input using the stylus pen;
  identify one or more objects among the objects of the user interface that can be mapped with a first user input using the stylus pen;
  provide graphic effects to the identified one or more objects distinct from another objects among the objects of the user interface;
  detect contact or proximity of the stylus pen with a selected object of the identified one or more objects provided with the graphic effects on the display;
  receive the first user input using the stylus pen through the wireless communication circuit, the first user input having a selected stylus pen input type from one or more stylus pen input types, while the stylus pen is in contact or proximate to the selected object; and
  in response to the first user input, map a function corresponding to the selected object to the selected stylus pen input type.

2. The electronic device of claim 1, wherein the instructions cause the at least one processor to:
 receive a second user input using the stylus pen through the wireless communication circuit while the user interface is being displayed on the display, the second user input having the selected stylus pen input type; and
 execute the function mapped to the selected stylus pen input type of the second user input in response to the second user input, regardless of a location of the stylus pen.

3. The electronic device of claim 1, wherein the instructions cause the at least one processor to display guidance information proximate to the selected object on the display, the display guidance information indicating the selected stylus pen input type.

4. The electronic device of claim 1, further comprising the stylus pen, and wherein the stylus pen comprises a button, wherein the stylus pen is configured to transmit one or more wireless signals corresponding to the one or more stylus pen input types.

5. The electronic device of claim 4, wherein the one or more stylus pen input types include a single-click input, a double-click input, and a long-click input on the button.

6. The electronic device of claim 1, wherein the instructions cause the at least one processor to determine the function, based at least in part on at least one piece of accessibility node information, shortcut key information, application shortcut information, or application link information.

7. The electronic device of claim 1, wherein the one or more objects comprise one or more shortcut key information objects, and the selected object comprises a selected shortcut key information objects of the one or more shortcut key information objects.

8. The electronic device of claim 1, wherein the instructions cause the processor to:
when a second user input is received from the stylus pen having a particular stylus pen input type from the one or more stylus pen input types while displaying the user interface, identify whether or not a function is mapped to the particular stylus pen input type; and
when there is no mapped function, switch to a mapping mode to display the user interface.

9. The electronic device of claim 1, wherein the wireless communication circuit is configured to wirelessly connect to the stylus pen using Bluetooth low energy (BLE).

10. An electronic device comprising:
a display configured to display a user interface;
at least one wireless communication circuit configured to wirelessly connect to a stylus pen;
at least one processor operatively connected to the display and the wireless communication circuit; and
a memory operatively connected to the at least one processor,
wherein the memory is configured to store the user interface, and
wherein the memory stores instructions that, when executed, cause the at least one processor to:
provide the user interface to the display;
initiate a mapping mode for mapping a function corresponding to a point or area with a user input using the stylus pen;
identify one or more points or areas in the user interface that can be mapped with a first user input using the stylus pen;
provide graphic effects to the identified one or more points or areas distinct from another areas of the user interface;
detect contact or proximity of the stylus pen with a point or area from the identified one or more points or areas in the user interface provided with the graphic effect;
receive the first user input using the stylus pen through the wireless communication circuit, the first user input having a selected stylus pen input type from one or more stylus pen input types, while the stylus pen is in contact or proximate with the point or area coordinates; and
in response to the first user input, map a function corresponding to the point or area coordinates to the selected stylus pen input type.

11. A method of mapping a function of an electronic device to an operation of a stylus pen, the method comprising:
displaying a user interface including one or more objects corresponding to one or more functions;
initiating a mapping mode for mapping a function corresponding to an object with a user input using the stylus pen;
identify one or more objects among the objects of the user interface that can be mapped with a first user input using the stylus pen;
provide graphic effects to the identified one or more objects distinct from another objects among the objects of the user interface;
detecting contact or proximity of the stylus pen with a selected object of the identified one or more objects provided with the graphic effects;
receiving the first user input using the stylus pen from the stylus pen while detecting contact or proximity of the stylus pen, the first user input having a selected stylus pen input type of one or more stylus pen input types; and
in response to the first user input, mapping a function corresponding to the selected object to the selected stylus pen input type.

12. The method of claim 11, further comprising:
receiving a second user input through the stylus pen from the stylus pen while the stylus pen is in contact or proximate with another location within the user interface for selecting another object of the one or more objects, the second user input having the selected stylus pen input type; and
in response to the second user input, executing the function corresponding to the selected object, regardless of location of the stylus pen.

13. The method of claim 12, further comprising displaying guidance information indicating the selected stylus pen input type proximate to the location within the user interface.

14. The method of claim 11, wherein the first user input using the stylus pen is generated by at least one input on a button included in the stylus pen.

15. The method of claim 11, further comprising providing at least one piece of accessibility node information, shortcut key information, application shortcut information, or application link information, which is supported by the user interface, in order to select one of the one or more functions.

16. The method of claim 11, further comprising:
displaying shortcut key information on the user interface;
wherein receiving the first user input comprises receiving the first user input in contact with or in proximity to a portion of the shortcut key information; and
wherein mapping the function comprises mapping a function corresponding to the portion of the shortcut key information to the selected stylus pen input type.

17. The method of claim 11, further comprising:
when a second user input having a particular stylus pen input type is received from the stylus pen while the user interface is displayed, identifying whether or not there is a function mapped to the selected stylus pen input type; and
when there is no mapped function, switching to a mapping mode to display the user interface.

18. The method of claim 11, further comprising:
receiving a second user input using the stylus pen through the at least one wireless communication circuit, the second user input having another selected stylus pen input type from one or more stylus pen input types, while the stylus pen is in contact or proximate with another point or area coordinates for selecting another function;
in response to the second user input, mapping another function corresponding to the other point or area coordinates to the other selected stylus pen input type;
in response to receiving a third user input having the selected stylus pen input type, performing the function regardless of location of the stylus pen; and in response to the third user input having the other selected stylus pen input type, performing the another function regardless of location of the stylus pen.

* * * * *